US009100929B2

(12) United States Patent
Bienas et al.

(10) Patent No.: US 9,100,929 B2
(45) Date of Patent: Aug. 4, 2015

(54) TERMINAL AND A METHOD FOR ESTABLISHING A CELLULAR NETWORK CONNECTION BETWEEN A TERMINAL AND A BASE STATION

(71) Applicant: Intel Mobile Communications GMBH, Neubiberg (DE)

(72) Inventors: Maik Bienas, Braunschweig (DE); Andreas Schmidt, Braunschweig (DE); Martin Hans, Bad Salzdetfurth (DE)

(73) Assignee: Intel Mobile Communications GmbH, Neubiberg, DE (US)

( * ) Notice: Subject to any disclaimer, the term of this patent is extended or adjusted under 35 U.S.C. 154(b) by 181 days.

(21) Appl. No.: 13/666,988

(22) Filed: Nov. 2, 2012

(65) Prior Publication Data
US 2014/0126460 A1     May 8, 2014

(51) Int. Cl.
*H04W 74/00* (2009.01)
*H04W 76/02* (2009.01)
*H04W 84/04* (2009.01)

(52) U.S. Cl.
CPC ............ *H04W 74/002* (2013.01); *H04W 76/02* (2013.01); *H04W 84/047* (2013.01)

(58) Field of Classification Search
CPC ............................ H04W 72/04; H04W 74/002
USPC .............. 370/312, 315, 329, 343, 400; 455/7, 455/424, 450, 517
See application file for complete search history.

(56) References Cited

U.S. PATENT DOCUMENTS

| | | | |
|---|---|---|---|
| 2006/0203828 A1* | 9/2006 | Kumazawa et al. | 370/400 |
| 2008/0207214 A1* | 8/2008 | Han et al. | 455/450 |
| 2009/0122738 A1* | 5/2009 | Chen et al. | 370/312 |
| 2009/0197624 A1* | 8/2009 | Kwak et al. | 455/517 |
| 2010/0130193 A1* | 5/2010 | Li et al. | 455/424 |
| 2011/0159802 A1* | 6/2011 | Binti Harum et al. | 455/7 |
| 2011/0176476 A1* | 7/2011 | Tsuruoka | 370/315 |
| 2011/0222525 A1* | 9/2011 | Kishigami et al. | 370/343 |
| 2012/0106468 A1* | 5/2012 | Engstrom et al. | 370/329 |

OTHER PUBLICATIONS

3GPP TS 36.300 V11.0.0 (Dec. 2011); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11); pp. 1-194.

* cited by examiner

*Primary Examiner* — Brian D Nguyen
*Assistant Examiner* — Toan Nguyen
(74) *Attorney, Agent, or Firm* — Schwabe, Williamson & Wyatt, P.C.

(57) ABSTRACT

A terminal may include a generator configured to generate a request for radio network resources from a cellular network; a transmitter configured to transmit the request for radio network resources to a relay device, wherein the request for radio network resources may be configured to be forwarded by the relay device to a base station of the cellular network; and a controller configured to establish a cellular network connection between the terminal and the base station of the cellular network using radio network resources assigned to the terminal by the cellular network.

21 Claims, 10 Drawing Sheets

TERMINAL AND A METHOD FOR ESTABLISHING A CELLULAR NETWORK CONNECTION BETWEEN A TERMINAL AND A BASE STATION

TECHNICAL FIELD

Various aspects relate to a terminal and a method for establishing a cellular network connection between a terminal and a base station.

BACKGROUND

Mobile radio communication terminal devices may perform a random access procedure in order to establish a cellular network connection with a base station. A mobile radio communication terminal device may randomly select a mobile radio resource for transmission from a predefined set of mobile radio resources. A mobile radio resource may be, for example, a certain time slot at a certain radio frequency with a certain access code. This access scheme may be subject to collisions as a requesting mobile radio communication terminal device may request the same mobile radio resources already selected by another mobile radio communication terminal device. Collisions may waste mobile radio resources and may increase transmission delays.

SUMMARY

A terminal may include a generator configured to generate a request for radio network resources from a cellular network; a transmitter configured to transmit the request for radio network resources to a relay device, wherein the request for radio network resources may be configured to be forwarded by the relay device to a base station of the cellular network; and a controller configured to establish a cellular network connection between the terminal and the base station of the cellular network using radio network resources assigned to the terminal by the cellular network.

A method for establishing a cellular network connection between a terminal and a base station may include generating a request for radio network resources from a cellular network; transmitting the request for radio network resources to a relay device, wherein the request for radio network resources may be configured to be forwarded by the relay device to the base station of the cellular network; and establishing a cellular network connection between the terminal and the base station of the cellular network using radio network resources assigned to the terminal by the cellular network.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the invention are described with reference to the following drawings, in which.

DESCRIPTION

The following detailed description refers to the accompanying drawings that show, by way of illustration, specific details and aspects in which the invention may be practised. These aspects are described in sufficient detail to enable those skilled in the art to practice the invention. Other aspects may be utilized and structural, logical, and electrical changes may be made without departing from the scope of the invention. The various aspects are not necessarily mutually exclusive, as some aspects can be combined with one or more other aspects to form new aspects. Various aspects are described for structures or devices, and various aspects are described for methods. It may be understood that one or more (e.g. all) aspects described in connection with structures or devices may be equally applicable to the methods, and vice versa.

The word "exemplary" is used herein to mean "serving as an example, instance, or illustration". Any aspect or design described herein as "exemplary" is not necessarily to be construed as preferred or advantageous over other aspects or designs.

The term "cellular network" is used herein to refer to a radio communications system configured in accordance with the network architecture of any one of, or any combination of, LTE (Long Term Evolution) cellular communications technology, UMTS (Universal Mobile Telecommunications System) cellular communications technology which may include the system enhancement HSPA (High Speed Packet Access), GSM (Global System for Mobile Communications) cellular communications technology which may include system enhancements General Packet Radio System (GPRS) and Enhanced Data rates for GSM Evolution (EDGE) and CDMA2000 (Code Division Multiple Access) cellular communications technology, although other cellular communications technology may be possible as well.

The terms "network", "cellular network", "cellular network communications system", "cellular radio communications technology" and "cellular communications system" may refer to the same logical entity and may be used interchangeably throughout the entire description.

Figure 1:
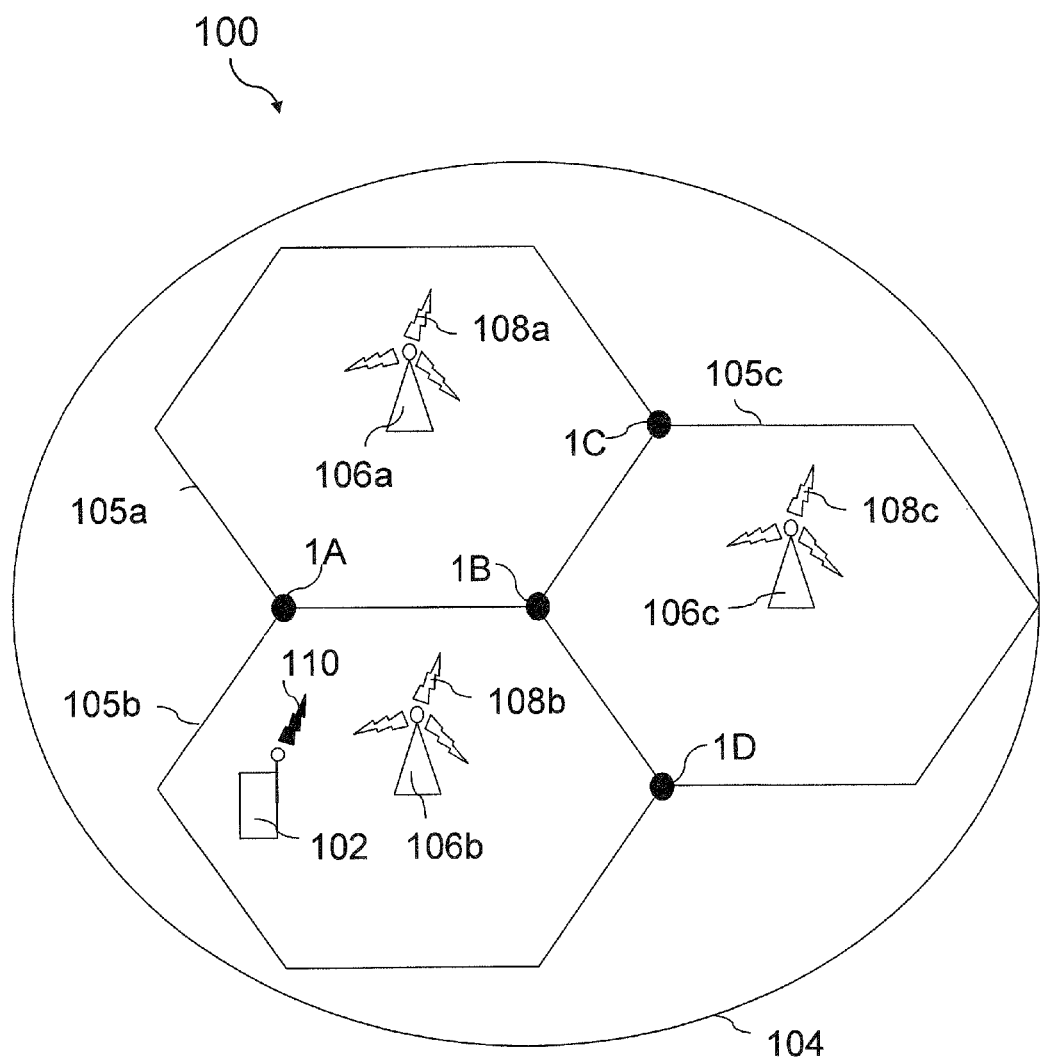
FIG. 1 shows a communications system.

FIG. 1 shows a communications system 100.

The communications system 100 may be configured in accordance with the network architecture of any one of, or any combination of, LTE (Long Term Evolution) cellular communications technology, UMTS (Universal Mobile Telecommunications System) cellular communications technology, GSM (Global System for Mobile Communications) cellular communications technology, and CDMA2000 (Code Division Multiple Access) cellular communications technology, although other cellular communications technology may be possible as well.

A terminal 102, such as, for example, a UE (user equipment) equipped with a SIM (Subscriber Identity Module) running on a UICC (Universal Integrated Circuit Card), may be within the area of coverage of a cellular network 104, such as, for example, a PLMN (Public Land Mobile Network). The area of coverage of the cellular network 104 may be the aggregate result of the coverage of at least one base station belonging to the cellular network 104, such as, for example, one, two, three, four, five, six, seven, eight, nine, ten or even more base stations belonging to the cellular network 104, such as tens or hundreds of base stations belonging to the cellular network 104. By way of an example, the area of coverage of the cellular network 104 in FIG. 1 may at least be the aggregate result of the coverage of base stations 106a, 106b, and 106c and others belonging to the cellular network 104 (other base stations not shown in FIG. 1).

In FIG. 1, each base station 106a, 106b, and 106c may be configured to transmit a downlink (DL) signal at a particular power to cover a particular geographical area. By way of an example, base station 106a may be configured to transmit DL signal 108a; base station 106b may be configured to transmit DL signal 108b; and base station 106c may be configured to transmit DL signal 108c. The geographical area covered by a particular base station 106a, 106b, or 106c may be substantially (namely, approximately) represented by a cell. By way of an example, the area of coverage of base station 106a may be substantially represented by cell 105a; the area of coverage of base station 106b may be substantially represented by cell 105b; and the area of coverage of base station 106c may be substantially represented by cell 105c. Accordingly, the area of coverage of the cellular network 104 may be the result of at least one cell, or the result of a tessellation of a plurality of cells, wherein each cell is an approximation of the area of coverage of a particular base station. By way of an example, area of coverage of the cellular network 104 may be the result of the tessellation of cells 105a, 105b, and 105c, wherein each cell is an approximation of the area of coverage of base stations 106a, 106b, and 106c, respectively.

Each cell 105a, 105b, and 105c may be an approximation of the area of coverage of a particular base station 106a, 106b, 106c. Nonetheless, there may be geographical regions that may be served by more than one base station. By way of an example, the geographical region on either side of the boundary formed between points 1A and 1B of FIG. 1 may be served by at least one of base stations 106a and 106b; the geographical region on either side of the boundary formed between points 1B and 1C of may be served by at least one of base stations 106a and 106c; and the geographical region on either side of the boundary formed between points 1B and 1D of may be served by at least one of base stations 106b and 106c.

A random access procedure may be used in the cellular communication system 100 when the terminal 102 with no cellular connection wants to establish a connection with the cellular network 104 (e.g. with any one of base station 106a, 106b, 106c of the cellular network 104). For example, a random access procedure may be used when a UE in an idle mode (e.g. in radio resource control (RRC) state RRC_IDLE in an LTE cellular network) wants to switch to a connected mode (e.g. to a "RRC_CONNECTED" state in an LTE cellular network). In an LTE cellular network, the following events may require a random access procedure:

1. An idle terminal 102 (e.g. UE) accesses the cellular network 104 (e.g. initial access from RRC_IDLE state);

2. A connected terminal 102 loses the connection and re-connects (e.g. connection re-establishment, for example after a radio link failure);

3. The cellular network 104 instructs a terminal 102 to handover to another mobile radio cell (e.g. from cell 105b to cell 105a);

4. Data for a connected terminal 102 arrives at a mobile radio core network, but the connected terminal's downlink is not synchronized (e.g. downlink (DL) data arrival during the RRC_CONNECTED state requiring radio access (RA) procedure);

5. A connected terminal 102 is instructed to transmit data, but the connected terminal's uplink is not synchronized (e.g., uplink (UL) data arrival during the RRC_CONNECTED state requiring radio access (RA) procedure); and 6. Positioning a terminal 102 when the terminal 102 is in a connected mode (e.g. RRC_CONNECTED state).

The aforementioned list of events is not exhaustive, and other events in an LTE cellular network may require a random access procedure.

In general, two types of random access procedures may be available. The first is contention based random access, and the second is non-contention based random access.

In contention based random access, a RACH (Random Access Channel) resource (e.g. time-slot and/or frequency band) may be selected randomly by each UE from the same set of resources. If two or more UEs transmit during overlapping time-slots and/or frequency bands, contention (e.g. collision) may be likely. In non-contention based random access, a unique RACH resource (e.g. a RACH preamble) may be assigned (namely, dedicated) to a UE, and the UE may be required to send an UL transmission including the unique RACH resource (e.g. the RACH preamble) within a certain time period, for example within a multiple of a TTI (Transmission time Interval) of the cellular network. Since the RACH resource is dedicated to the UE, contention may not occur.

Figure 2A:
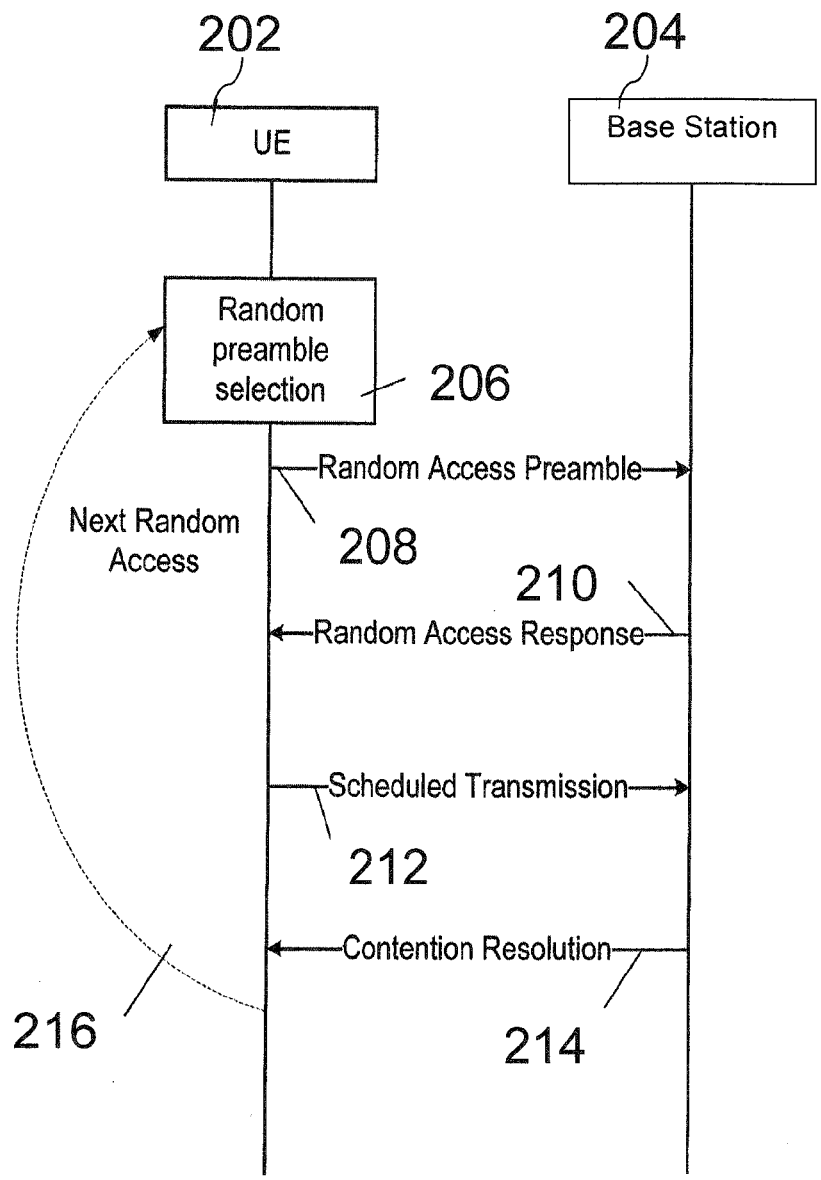
FIG. 2A and FIG. 2B show message flows for performing contention and non-contention based random access procedure between a user equipment and a base station.
Figure 2B:
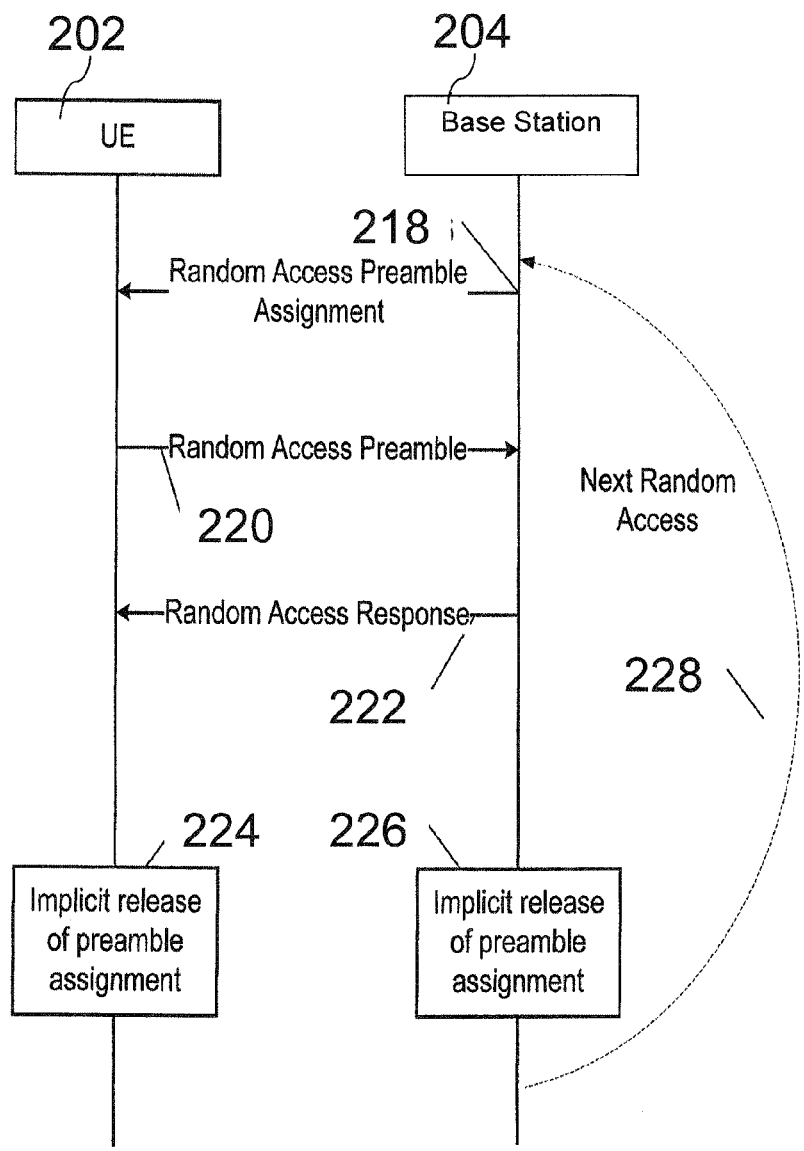

FIG. 2A and FIG. 2B show message flows for performing contention and non-contention based random access procedure between a user equipment and a base station As shown in FIG. 2A, the UE 202 may randomly choose a preamble at 206 when performing a contention-based random access procedure. The UE 202 may transmit the preamble to base station 204 in the next available RACH occasion at 208. For example, the RACH occasion may be a position in frequency and/or time at which the UE 202 may send an UL transmission to the base station 204. The position in frequency and/or time of these RACH occasions may be configured by the mobile radio network and broadcasted by the base station 204 to the UE 202 within the system information. If a collision occurs at 208, the UE 202 may restart the contention based random access procedure.

The UE 202 may listen for a response 210 from the base station 204 and may obtain information about the mobile radio resources to use for a scheduled transmission. Random Access Response 210 may contain, among other things, the received random access preamble ID (RAPID) of UE 202; information about a mobile radio resource, for example time slot (e.g. timing alignment information) and/or frequency band, assigned to the UE 202; and a cell radio network temporary ID (C-RNTI) assigned to the UE 202. After reception of the response 210, UE 202 may transmit the scheduled transmission 212 using the assigned mobile radio resource, and may listen for a subsequent response from base station 204 (e.g. contention resolution response 214). The response 214 may indicate whether the message 212 is received without contention. If a collision occurs during the scheduled transmission 212, the UE 202 may restart the contention based random access procedure. For subsequent random access procedures, the same procedure may be repeated (indicated by arrow 216). In other words, the UE 202 may randomly select another preamble each time UE 202 transmits a message and/or experiences a collision.

As shown in FIG. 2B, UE 202 may be scheduled for non-contention based transmission and may obtain a dedicated preamble at 218 from base station 204 prior to the start of the transmission of UE 202. The transmission is non-contention based because base station 204 selects an unused preamble for UE 202. At 220, UE 202 may decide to transmit the assigned preamble in the next available RACH occasion and listens to the response from base station 204. The UE 202 may be required to transmit the assigned preamble within a certain time period. If the certain time period expires, the assigned preamble may be released by the base station 204, and the UE 202 may be required to obtain another dedicated preamble from the base station 204. Base station 204 sends a random access response 222 to the UE 202. The random access response 202 may contain, among other things, the received random access preamble ID (RAPID) of UE 202; information about a mobile radio resource, for example time slot (e.g. timing alignment information) and/or frequency band, assigned to the UE 202; and a cell radio network temporary ID (C-RNTI) assigned to the UE 202. After reception of the response 222, UE 202 may transmit a scheduled transmission, such as, for example scheduled transmission 212 in FIG. 2A, using the assigned mobile radio resource.

Non-contention based random access procedure may be faster and more reliable than the contention-based procedure, since less contentions (e.g. collisions) occur and less time may be spent restarting the random access procedure due to the contentions. However, a non-contention based random access procedure may require a connection setup prior to the execution, which may not always be possible. Further, the number of dedicated preambles may be limited.

Contention based random access procedure may be used in the first five events described above (i.e. not for positioning purposes), while non-contention based random access procedure may be used for the following events: handover, DL data arrival, and positioning.

Table 1 gives an overview of the messages exchanged between a UE and a radio access network (RAN) during initial access of the UE to the cellular network. Table 1 may be directed to "RRC connection establishment" procedure in an LTE cellular network, but the principles may be application to a cellular network configured in any other network architecture (e.g. GSM, CDMA2000, UMTS).

The connection establishment procedure may include a first part including a random access procedure executed on a RACH (random access channel) and/or a DL-SCH (Downlink shared channel), and a second part executed on CCCH (Common Control Channel) and/or DCCH (Dedicated Control Channel).

TABLE 1

Typical message sequence chart for a RRC connection establishment procedure by using random access (not exhaustive)

| Step | Direction | Physical Channel | Transport Channel | Logical Channel | Signaling Radio Bearer (SRB) | Part | Comment |
| --- | --- | --- | --- | --- | --- | --- | --- |
| 1 | UL | PRACH | RACH | n.a. | n.a. | 1 | Pre-amble transmission |
| 2 | DL | PDSCH | DL-SCH | n.a. | n.a. | 1 | Random Access Response (RAR) generated by MAC Layer containing: RA-Preamble Identifier Timing Alignment information initial UL grant information assignment of Temporary C-RNTI |
| 3a | UL | PUSCH | UL-SCH | CCCH | SRB0 | 2 | In case of initial access: RRC Connection Request message containing either the S-TMSI or a random reference. |
| 3b | UL | PUSCH | UL-SCH | CCCH | SRB0 | 2 | In case of radio link failure: RRC Connection Re-establishment Request message containing the C-RNTI. |
| 4 | DL | PDSCH | DL-SCH | CCCH | SRB0 | 2 | RRC Connection Setup message for the selected UE identity in the RRC Connection |

TABLE 1-continued

Typical message sequence chart for a RRC connection establishment procedure by using random access (not exhaustive)

| Step | Direction | Physical Channel | Transport Channel | Logical Channel | Signaling Radio Bearer (SRB) | Part | Comment |
|---|---|---|---|---|---|---|---|
| 5 | UL | PUSCH | UL-SCH | DCCH | SRB1 | 2 | Request message RRC Connection Setup Complete message |

The resources on the RACH may be limited and may be affected by the risk of contention. As described above, a RACH resource may be defined by a certain time instance (e.g. timing alignment, timing advance, time slot), a certain frequency sub-band, and a certain access code (e.g. a preamble). Each time a contention on the RACH occurs, i.e. two or more mobile devices (e.g. UEs) have randomly selected the same resource for transmission, the random access may fail. When the random access fails, the access attempt may be repeated and the used resources may be wasted, as described in relation to FIG. 1A. To avoid such contention, the RACH resources may be configured in each cell to be sufficient in most cases. For example, the number of RACH resources may be substantially matched to the number of mobile devices in the cell. However, RACH resources may be reserved permanently, and this may limit the resources that are available for other uses, e.g. user data. Therefore, there may exist a trade off between sufficient resources for RACH, and not reducing too many resources for other kinds of communication (e.g. user data exchange).

Whilst contention (e.g. collisions) on a RACH may be possible, some situations may increase the likelihood of such contention. For example, the following situations as identified at 3GPP (3rd Generation Partnership Project) may increase the chances of collisions on a RACH.

Firstly, a large number of MTC (Machine-type Communication) devices may be deployed in a cell. The number of MTC devices may be a multiple of devices used by human users. Typically, the amount of data to be transmitted by MTC devices is low, but each new transmission may require a random access (i.e. a switch from "idle mode" to "connected mode" of operation). In some situations (e.g. when devices are supplied with power after a power disruption and/or when a triggering event occurs), many MTC devices may attempt to perform a random access simultaneously. This may lead to many RACH contentions, which may affect MTC devices and devices used by human users alike.

Secondly, the number of devices used by human users may be large (e.g. in big cities, such as, for example Tokyo, New York, etc.), and may be moving together (e.g. in a subway during rush hour). Each time the large number of devices used by human users passes certain areas (e.g. routing area), all UEs in "idle mode" may have to perform a random access to inform the network about their new location. Therefore, many such devices may try to perform the random access procedure simultaneously, which may lead to a RACH contention.

3GPP may offer some measures to reduce the chances of RACH contention in the above-mentioned situations. For example, devices (e.g. UEs and/or MTC devices) may indicate to the network (e.g. a base station of the network) during random access that they are delay tolerant. In other words, devices that may perform a random access procedure at a later time may indicate this to the network. For example, some MTC devices may allow some delay when accessing the cellular network. The network may use this information to assign an "extended wait timer" to the relevant devices as part of a message that rejects the connection request (RRC Connection Reject message in case of LTE). Therefore, contention may be avoided by rejecting a request from such delay tolerant devices, and directing these devices to re-start the random access procedure at a later time. The disadvantages of this method may be that an unsuccessful random access is a pre-assumption for this method. In other words, resources are wasted before the method is usable. Further, additional delay is added to the random access procedure for delay tolerant devices. In addition, the number of random accesses is not reduced.

Another possible measure to reduce the chances of RACH contention in the above-mentioned situations may be to define different routing area boundaries (e.g. tracking area boundaries in an LTE cellular network), which may be assigned randomly to different devices. With this only a subset of the devices may need to perform a routing area update at the same location. The disadvantage of this method may be that a large number of devices may still perform a random access. In typical cases, the number of devices performing simultaneous random access may be reduced by a factor of 2 to 4, but assuming about 1000 devices involved in this scenario, the reduced number of 250 to 500 may be very large and will may lead to a RACH overload, and thus, contention. Further, the number of total random accesses is not reduced.

Whilst the number of devices needing to perform a random access procedure may be increasing, many devices (e.g. mobile terminals, for example UEs) may be equipped with several radio access technologies (RATs). For example, a UE may use a cellular technology to connect to a cellular network, e.g. GSM, UMTS, LTE, by using the licensed bands. In addition, the UE may use a license-free band of frequencies, e.g. short-range communications technology to get sporadic access to nearby devices and content, e.g. Bluetooth and Wi-Fi (e.g. IEEE 802.11). Some devices (e.g. a terminal) may allow relaying of data and/or messages, received from another device (e.g. another terminal) via a short-range communications technology (e.g. Wi-Fi), to the cellular network by using a cellular technology. Such devices may be called a "relay device", and such networks of sporadically connected terminals and relay devices may be called "Opportunistic Networks". In addition to the concept of opportunistic networks, methods may be developed (e.g. in studies at 3GPP) to enable a direct communication between a terminal and a relay device. Such direct communication methods between a terminal and a relay device may also be encompassed in the terms "license-free band of frequencies" and "short-range communications technology".

In various examples presented in the following description, a terminal may use a short-range radio connection (on a license-free band of frequencies and/or a short-range communications technology) with a relay device to request for radio network resources from a cellular network. The terminal may proceed to establish a cellular network connection with the cellular network using the radio network resources assigned to it by the cellular network. The information about radio network resources assigned to the terminal by the cellular network may be received by the terminal directly from a base station of the cellular network and/or from the relay device.

An effect of the above may be at least one of:

1) Avoidance of a contention based random access procedure.

2) Avoidance of usage of a cellular air interface by the terminal for a connection setup between the terminal and a base station of a cellular network.

3) Reduction in RACH overload.

4) Reduction in the number of RACH contentions.

Figure 3:
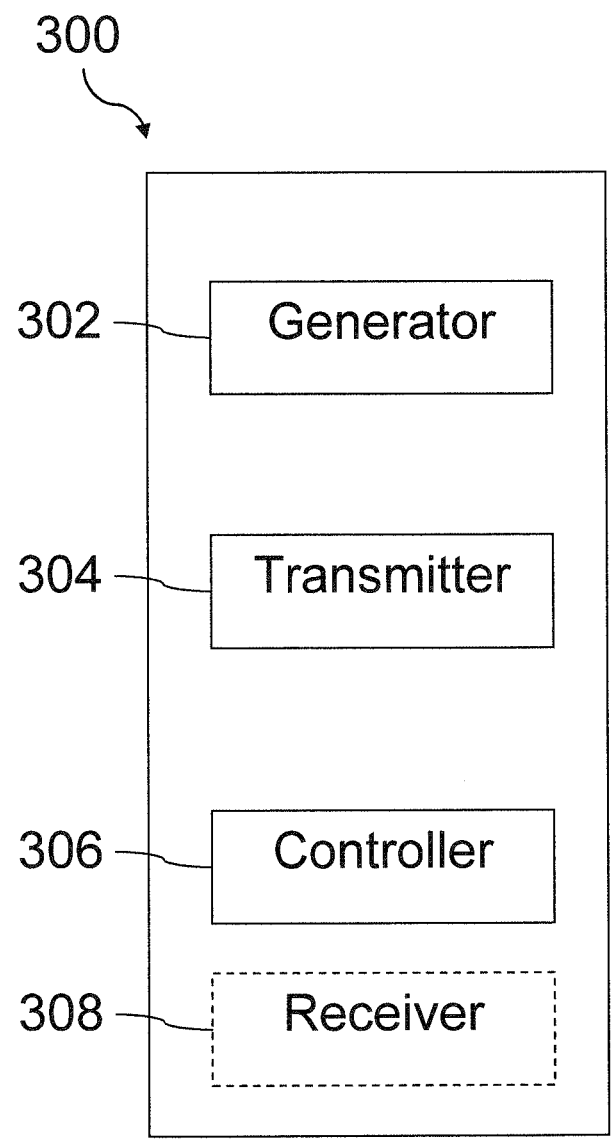
FIG. 3 shows a terminal including a generator, a transmitter, and a controller.

FIG. 3 shows a terminal 300 including a generator 302, a transmitter 304, and a controller 306. The terminal 300 may also include a receiver 308.

The terminal 300 may include, or may be, a mobile terminal, such as, for example, a UE. The UE may be equipped with a SIM (Subscriber Identity Module), and the SIM may run on a UICC (Universal Integrated Circuit Card). For example, the terminal 300 may correspond to the terminal 102 shown in FIG. 1.

Each of the generator 302, the transmitter 304, the controller 306 and the receiver 308 may be implemented by means of a circuit. The word "circuit" is used herein to mean any kind of a logic implementing entity, which may be special purpose circuitry or processor executing software stored in a memory, firmware, or any combination thereof. Thus, in one or more examples, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Different circuits can thus also be implemented by the same component, e.g. by a processor executing two different programs.

The terminal 300 may be configured to support a plurality of RATs. In other words, the terminal 300 may be configured to operate in a plurality of radio networks, wherein each radio network is configured in accordance with the network architecture of a different RAT. Stated in yet another way, the terminal 300 may be configured to communicate, for example with other devices, using a plurality of RATs. The other devices may include other UEs, and/or one or more base stations (e.g. a base station configured according to the base stations 106a, 106b, 106c shown in FIG. 1), and/or other devices configured to establish a communicative link with the terminal 300.

The terminal 300 may be configured to communicate using a plurality of RATs by means of at least one of the transmitter 304 and the receiver 308. The plurality of RATs may include at least one cellular network technology and at least one non-cellular radio technology. For example, the terminal 300 may be configured to operate in a cellular network and a non-cellular network.

Illustratively, the terminal 300 may be configured to communicate with other cellular network devices (e.g. other terminals and/or one or more base stations) within a cellular network. Therefore, the plurality of RATs may include at least one cellular network technology, such as, for example, at least one of LTE (Long Term Evolution) cellular network communications technology, UMTS (Universal Mobile Telecommunications System) cellular network communications technology, GSM (Global System for Mobile Communications) cellular network communications technology, CDMA2000 (Code Division Multiple Access) cellular network communications technology, or any other cellular network communications technology which may be known as such in the art.

Cellular network technologies may operate in a licensed band of frequencies. In other words, cellular network operators may require a license to provide cellular network services to subscribers and/or users. Accordingly, the at least one cellular network technology of the plurality of RATs may refer to radio communications technology that uses a licensed band of frequencies (e.g. using a GSM and/or a UMTS and/or a LTE band of frequencies).

As described above, the terminal 300 may be configured to additionally operate in a non-cellular network, namely, the terminal 300 may be configured to communicate with other devices (e.g. other terminals) using radio access technology other than cellular network technology. For example, the terminal 300 (e.g. a UE) may communicate (e.g. exchange data and/or content) with another UE using at least one of Wi-Fi radio technology, Bluetooth radio technology, Ultra-Wideband radio technology, Zigbee radio technology, or any other non-cellular radio technology which may be known as such in the art.

Non-cellular radio technologies may operate in a license-free band of frequencies. In other words, operators may not require a license to provide non-cellular radio services to subscribers and/or users. Accordingly, the at least one non-cellular radio technology of the plurality of RATs may refer to radio communications technology that uses a licensed-free band of frequencies (e.g. using a Wi-Fi and/or a Bluetooth and/or a Ultra-Wideband and/or a Zigbee band of frequencies).

Alternatively, or in addition to the above, non-cellular radio technologies may operate in a licensed frequency band. For example, non-cellular technology may be currently developed at 3GPP within the study item named "Feasibility Study for Proximity Services (ProSe)". The outcome may be a new radio technology that may enable a direct communication between two devices by using licensed spectrum without using elements from a core network of the cellular radio network that uses the same frequency band, e.g. a eNB may not be required for this kind of communication. This potential new technology may be referred to as "LTE direct" and may be regarded as a non-cellular radio technology.

Non-cellular radio technologies may include, or may be, short-range communications technology. In other words, a node of a non-cellular radio network may provide a non-cellular radio connection to devices within a short distance from the node, for example within a distance of less than or equal to about 3 km from the node, for example less than or equal to about 2 km from the node, for example less than or equal to about 1 km from the node, for example, less than or equal to about 500 m from the node, for example less than or equal to about 300 m from the node, for example less than or equal to about 250 m from the node, for example less than or equal to about 200 m from the node, for example less than or equal to about 180 m from the node, for example less than or equal to about 150 m from the node, for example less than or equal to about 100 m from the node, for example less than or equal to about 80 m from the node, for example less than or equal to about 50 m from the node, for example less than or equal to about 30 m from the node, for example less than or equal to about 15 m from the node, for example less than or equal to about 10 m from the node, for example less than or equal to about 5 m from the node, for example less than or equal to about 1 m from the node, for example less than or equal to about 80 cm from the node, for example less than or equal to about 50 cm from the node, for example less than or equal to about 20 cm from the node, although other distances may be possible as well.

As shown in FIG. 3, the terminal 300 may include a generator 302. The generator 302 may be configured to generate a request for radio network resources from a cellular network (e.g. the cellular network 104 shown in FIG. 1).

By way of an example, the request for radio network resources from the cellular network may include, or may be, a request for initial access to the cellular network, e.g. when the terminal 300 switches from the RRC_IDLE state to the RRC_CONNECTED state in an LTE cellular network. In another example, the request for radio network resources from the cellular network may include, or may be, a request for a time slot (e.g. a timing alignment value, a timing advance value) at which the terminal 300 may exchange data with a base station of the cellular network (e.g. a time slot at which terminal 300 may exchange user and/or control data with an eNB of an LTE cellular network). In yet another example, the request for radio network resources from the cellular network may include, or may be, a request for a frequency sub-band over which the terminal 300 may exchange data with a base station of the cellular network (e.g. a frequency sub-band with which terminal 300 may exchange user and/or control data with an eNB of an LTE cellular network). In some cases, the request for radio network resources from the cellular network may include, or may be, a request for an access code with which the terminal 300 may access a channel of the cellular network (e.g. a request for a dedicated RACH preamble, for example in non-contention based random access shown in FIG. 2B).

As shown in FIG. 3, the terminal 300 may include the transmitter 304. The transmitter 304 may be configured to transmit the request for radio network resources, generated by the generator 302, to at least one relay device. As described above, the terminal 300 may be configured to communicate with other devices using a plurality of RATs, and the plurality of RATs may include at least one non-cellular radio technology. The transmitter 304 may be configured to transmit the request for radio network resources to the at least one relay device using a non-cellular radio technology, for example using Wi-Fi and/or Bluetooth and/or Ultra-wideband and/or Zigbee and/or LTE-direct. The at least one relay device may be in close proximity to the terminal 300 (e.g. less than or equal to about 300 m), and is not shown in FIG. 3.

As shown in FIG. 3, the terminal 300 may include the receiver 308. The receiver 308 may be configured to receive information about radio network resources assigned to the terminal 300 by the cellular network, which may be received from another device (e.g. another UE, and/or one or more base stations).

As shown in FIG. 3, the terminal 300 may include the controller 306. The controller 306 may be configured to establish a cellular network connection between the terminal 300 and a base station (e.g. a NB and/or an eNB) of the cellular network (e.g. a GSM and/or UMTS and/or LTE communications system) using radio network resources (e.g. a time slot and/or a frequency sub-band and/or an access code) assigned to the terminal 300 by the cellular network.

Figure 4:
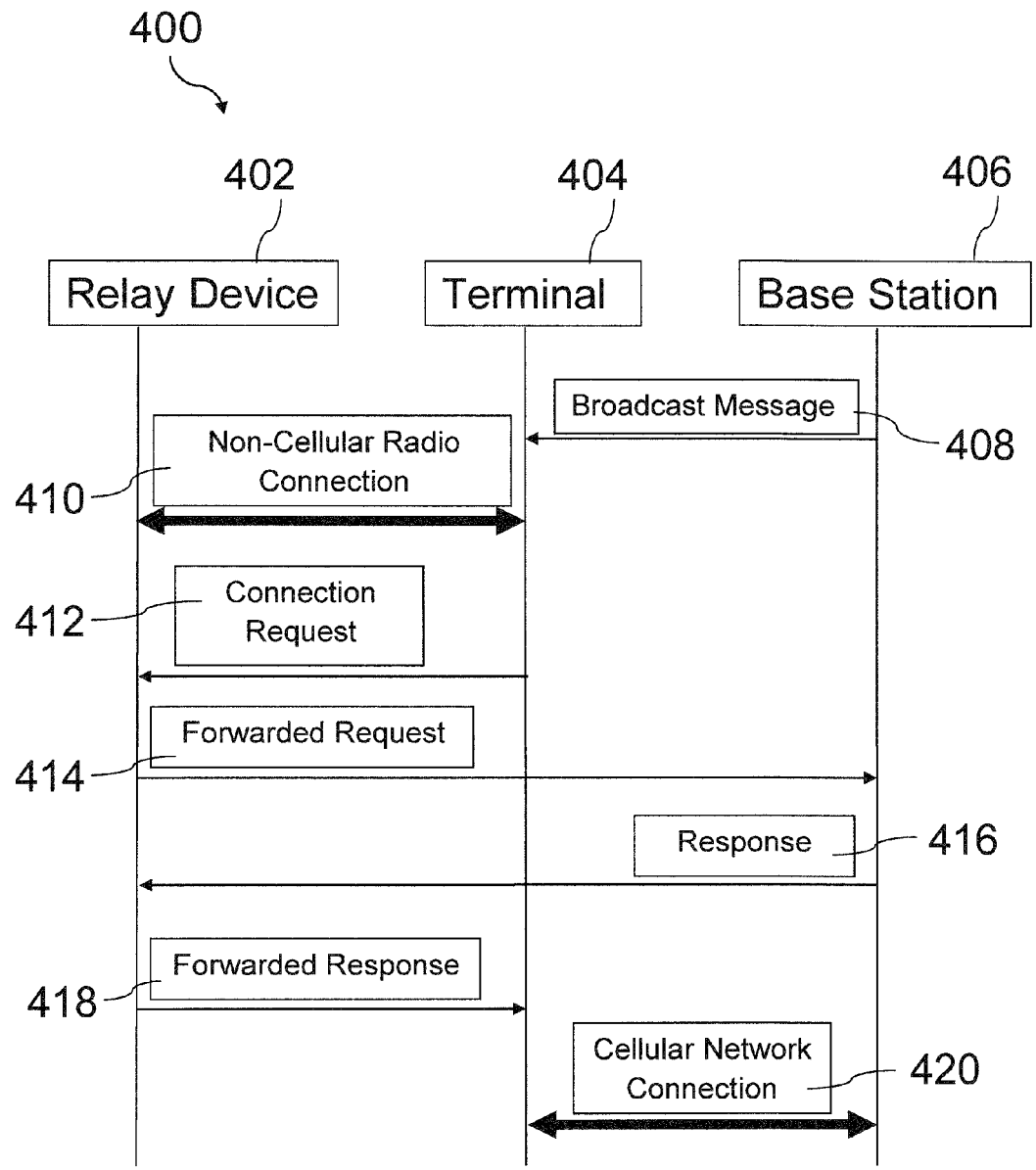
FIG. 4 shows a message flow among a relay device, a terminal, and a base station.

FIG. 4 shows a message flow 400 among a relay device 402, a terminal 404, and a base station 406.

The message flow 400 illustrates that the terminal 404 may establish a cellular network connection 420 with the base station 406 of a cellular network using the relay device 402, without having to perform a random access procedure with the base station 406.

The relay device 402 may include, or may be, a mobile terminal, such as, for example, a UE (user equipment). The relay device 402 may be equipped with a SIM (Subscriber Identity Module), and the SIM may run on a UICC (Universal Integrated Circuit Card). Only one relay device 402 is shown as an example, however the number of relay devices may be greater than one, and may, for example, be two, three, four, five, six, seven, eight, nine, or on the order of tens, hundreds of, or even more relay devices.

The relay device 402 may be configured to support a plurality of RATs. In other words, the relay device 402 may be configured to communicate with other devices (e.g. UEs and/or one or more base stations) using a plurality of RATs.

The relay device 402 may be configured to communicate (e.g. exchange data and/or messages) with other devices (e.g. UEs and/or one or more base stations) using at least one cellular network technology (e.g. LTE and/or UMTS and/or GSM and/or CDMA2000). Accordingly, the plurality of RATs supported by the relay device 402 may include at least one cellular network technology (e.g. LTE and/or UMTS and/or GSM and/or CDMA2000).

The relay device 402 may also be configured to communicate (e.g. exchange data and/or messages) with other devices (e.g. UEs) using at least one non-cellular radio technology (e.g. a short-range communications technology and/or a radio technology that uses a license-free band of frequencies, for example Wi-Fi and/or Bluetooth). Accordingly, the plurality of RATs supported by the relay device 402 may further include at least one non-cellular radio technology (e.g. a short-range communications technology, for example Wi-Fi and/or Bluetooth).

The terminal 404 may be configured in a similar manner to the terminal 300 shown in FIG. 3. For example, the terminal 404 may include a generator (similar to generator 302 shown in FIG. 3), a transmitter (similar to transmitter 304 shown in FIG. 3), and a controller (similar to controller 306 shown in FIG. 3).

The terminal 404 may be configured to support a plurality of RATs. In other words, the terminal 404 may be configured to communicate with other devices (e.g. UEs and/or one or more base stations) using a plurality of RATs. Similarly to the relay device 402, the plurality of RATs supported by the terminal 404 may include at least one cellular network technology (e.g. LTE and/or UMTS and/or GSM and/or CDMA2000) and at least one non-cellular radio technology (e.g. a short-range communications technology, for example Wi-Fi and/or Bluetooth).

The base station 406 may be a node of a cellular network. For example, the base station 406 may correspond to at least one of the base stations 106a, 106b, 106c of the cellular network 104 shown in FIG. 1. For example, the base station 406 may be a node (e.g. a NodeB) of an UMTS cellular network. In another example, the base station 406 may be a node (e.g. an eNodeB) of an LTE cellular network. In yet another example, the base station 406 may be a node of a GSM cellular network. In some cases, the base station 406 may be a node of a plurality of cellular networks. For example, the base station 406 may be shared among a plurality of cellular network operators, e.g. shared among two or more PLMNs (Public Land Mobile Networks). Accordingly, devices (e.g. UEs) within a coverage area (e.g. a cell) of the base station 406 may be able to access two or more PLMNs using the base station 406. Therefore, the base station 406 may be a base station of at least one cellular network (e.g. the base station 406 may be a NodeB of a GSM cellular network, and a eNodeB of an LTE cellular network).

The relay device 402 and the terminal 404 may be located within a cell served by the base station 406 (e.g. within the cell 105b served by the base station 106b shown in FIG. 1). The relay device 402 may be connected to the base station 406 via a cellular network connection. In other words, the relay device 402 may have a cellular network connection established with the base station 406. For example, the relay device 402 may be in an RRC_Connected state with respect to the base station 406 (e.g. an eNodeB) of an LTE cellular communications network. Therefore, the relay device 402 may not need to perform a random access procedure before data and/or messages are exchanged between the relay device 402 and the base station 406.

Alternatively, the relay device 402 may be a device that may have a high priority of access with respect to the base station 406. For example, the relay device 402 may be included in a list of priority-users of the base station 406. Therefore, the relay device 402 may easily establish a cellular network connection with the base station 406. For example, the relay device 402 may easily switch from a RRC_IDLE mode to a RRC_CONNECTED mode in an LTE cellular communications network.

The terminal 404, in addition to being within the cell served by the base station 406, may be in close proximity to the relay device 402. For example, the terminal 404 may be within a coverage area of a non-cellular radio technology supported by the relay device 402 (e.g. a short-range communications technology, for example Wi-Fi and/or Bluetooth and/or Ultra-Wideband and/or Zigbee and/or LTE-direct). By way of another example, the terminal 404 and the relay device 402 may be separated from each other by a distance of less than or equal to about 300 m. Accordingly, the relay device 402 and the terminal 404 may be close enough to each other to establish a non-cellular radio connection (e.g. a Wi-Fi, Bluetooth, Zigbee or LTE direct connection).

The messages of the message flow 400 are described in the following.

As shown in FIG. 4, the message flow 400 may include a broadcast message 408. The broadcast message 408 may be transmitted by the base station 406 to all devices (e.g. all UEs) located within a cell served by the base station 406. For example, the broadcast message 408 may be a downlink (DL) transmission sent on a PBCH (Physical Broadcast Channel) to all devices (e.g. all UEs) located within the cell sewed by the base station 406.

The area of coverage of the base station 406 may extend to an edge of at least one neighboring cell. Accordingly, the broadcast message 408 may be received by devices (e.g. UEs) located within at least one neighboring cell, which may be located near to an edge of the at least one neighboring cell.

The terminal 404 may be configured to measure a signal power of the broadcast message 408. For example, the terminal 404 may be configured to measure the signal power of the DL transmission sent on the PBCH (Physical Broadcast Channel) by the base station 406. The measured signal power of the broadcast message 408 may be used to adjust an uplink (UL) transmission from the terminal 404 to the base station 406 when the cellular network connection 420 is established between the terminal 404 and the base station 406 (see description below). Alternatively, or in addition to the above, the measured signal power of the broadcast message 408 may be reported by the terminal 404 to the base station 406. The measured signal power reported to the base station 406 may be used by the base station 406 to adjust a subsequent DL transmission from the base station 406 to the relay device 402 and/or the terminal 404 (see description below).

The broadcast message 408 may include information about at least one potential relaying device within the cell served by the base station 406. The relay device 402 may be selected from the at least one potential relaying device using information contained in the broadcast message 408, namely using information about the at least one potential relaying device within the cell served by the base station 406.

The broadcast message 408 may include information about an identity of the at least one potential relay device. For example, the identity of the at least one potential relay device may include a C-RNTI (Cell-Radio Network Temporary Identifier) and/or an IMSI (International Mobile Subscriber Identity) of each potential relaying device of the at least one potential relaying device.

The broadcast message 408 may include information about a position of the at least one potential relaying device. The terminal 404 may select the relay device 402 from the at least one potential relaying device based on the position. For example, the terminal 404 may select the potential relaying device closest to it as the relay device 402.

The at least one potential relaying device may be registered with at least one cellular network (e.g. at least one PLMN) using and/or sharing the base station 406. For example, a first potential relaying device within the cell served by the base station 406 may be registered with a first PLMN (e.g. a PLMN according to UMTS network technology), whilst a second potential relaying device within the cell served by the base station 406 may be registered with a second PLMN (e.g. a PLMN according to LTE network technology, or another PLMN according to UMTS network technology).

The broadcast message 408 may include information about at least one cellular network supported by the at least one potential relaying device. Information about the at least one cellular network may include information about the network configuration (e.g. GSM or UMTS or LTE or CDMA2000) of the at least one cellular network. The terminal 404 may select the relay device 402 from the at least one potential relaying device based on the network configuration of the cellular network that is supported by the at least one potential relaying device. For example, the terminal 404 may want to establish an LTE network connection with the base station 406, and may choose a potential relaying device that supports such an LTE network connection as the relay device 402.

The broadcast message 408 may include information about an identity of the at least one cellular network supported by the at least one potential relaying device. The identity of the at least one cellular network may include at least one of an MCC (Mobile Country Code), MNC (Mobile Network Code), and LAC (Location Area Code) of the at least one cellular network.

The at least one potential relaying device within the cell may be configured to communicate with other devices (e.g. other UEs) using at least one non-cellular radio technology (e.g. a short-range communications technology, for example Wi-Fi, Bluetooth, Ultra-Wideband, Zigbee or LTE-direct). For example, a first potential relaying device within the cell may be configured to support a Wi-Fi connection, whilst a second potential relaying device within the cell may be configured to support Wi-Fi and Bluetooth connections.

The broadcast message 408 may include information about the at least one non-cellular radio technology (e.g. a short-range communications technology, for example Wi-Fi, Bluetooth, Ultra-Wideband, Zigbee or LTE-direct) supported by each potential relaying device of the at least one potential relaying device. Information about the at least one non-cellular radio technology may include information about the configuration (e.g Wi-Fi and/or Bluetooth and/or Ultra-Wideband and/or Zigbee and/or LTE-direct) of the at least one non-cellular radio technology. The terminal 404 may select the relay device 402 from the at least one potential relaying device based on the configuration of the non-cellular radio technology supported by the at least one relaying device. For example, the terminal 404 may want to establish a Wi-Fi connection with the relay device 402, and may choose a potential relaying device that supports such a Wi-Fi connection as the relay device 402.

The broadcast message 408 may include information about an identity of the at least one non-cellular radio technology supported by each potential relaying device of the at least one potential relaying device. The identity of the at least one non-cellular radio technology may include an SSID (Service Set Identification) of the at least one non-cellular radio technology.

As described above, a cellular network connection may be established in at least the following events: initial access to a cellular network; connection re-establishment (e.g. after radio link failure); handover to another base station, downlink (DL) and/or uplink (UL) data synchronization; and positioning of a terminal. The at least one potential relaying device within the cell served by the base station 406 may be configured to be used as the relay device 402 for a particular event (e.g. initial access to a cellular network, connection re-establishment, handover, etc.). For example, a first potential relaying device may be configured to be used as the relay device 402 when initial access to the cellular network is desired by the terminal 404, whilst another potential relaying device may be configured to be used as the relay device 402 when positioning is desired by the terminal 404.

The broadcast message 408 may include information indicating which of the at least one potential relaying device may be used for a particular event (e.g. initial access to a cellular network, connection re-establishment, handover, etc.). In other words, each potential relaying device may be assigned for use in a particular event. The broadvase message 408 may include information indicating such an assignment. The terminal 404 may select the relay device 402 from the at least one potential relaying device based on the events supported by (e.g. assigned to) the at least one potential relaying device. For example, the terminal 404 may want to establish a cellular network connection for positioning purposes, and the terminal 404 may select a potential relaying device that supports positioning (e.g. assigned for use during positioning) as the relay device 402.

In summary, the terminal 404 may receive the broadcast message 408 (e.g. a DL transmission) from the base station 406, and may select the relay device 402 from at least one potential relaying device using the information contained in the broadcast message 408.

As shown in FIG. 4, the terminal 404 may establish a non-cellular radio connection 410 (e.g. a Wi-Fi connection) with the relay device 402 (e.g. a potential relaying device selected as the relay device 402). For example, the broadcast message 408 may include an SSID of the non-cellular radio connection (as described above), and the terminal 404 may use the SSID to establish the non-cellular radio connection 410 (e.g. a Wi-Fi connection) with the relay device 402.

The message flow 400 may include a request for radio network resources from a cellular network (hereinafter referred to as connection request 412). For example, the request 412 may be at least one of a request for initial access to the cellular network (e.g. a RRC Connection request), a request for a time slot to exchange data with the base station 406 (e.g. a timing alignment value and/or a timing advance value), and a request for a frequency sub-band to exchange data with the base station 406.

The connection request 412 may be made for at least one of the following purposes: initial access to a cellular network, connection re-establishment (e.g. after radio link failure), handover to another base station, downlink (DL) and/or uplink (UL) data synchronization, and positioning. As described above, the terminal 404 may measure the signal power of the broadcast message 408. The connection request 412 may include the measured signal power of the broadcast message 408.

The terminal 404 may transmit the connection request 412 (e.g. a RRC Connection request) to the relay device 402 via the non-cellular radio connection 410 (e.g. Wi-Fi connection) established between the relay device 402 and the terminal 404. The non-cellular radio connection 410 between the relay device 402 and the terminal 404 may be secured by encrypting data and/or messages exchanged between the relay device 402 and the terminal 404. For example, the connection request 412 may be encrypted using credentials (e.g. using at least one secret key) stored in the SIM of at least one of the relay device 402 and the terminal 404.

The connection request 412 (e.g. a RRC Connection request) may include an identity of the terminal 404 (e.g. a C-RNTI of the terminal 404), and an identity (e.g. the MCC/II/INC/LAC) of cellular network from which radio network resources are requested. The connection request 412 may include a forwarding flag. The forwarding flag of the connection request 412 may be configured to indicate to the relay device 402 that the connection request 412 is to be forwarded to the cellular network indicated in the connection request 412 (e.g. the cellular network may be indicated by its MCC/MNC/LAC).

The relay device 402 may receive the connection request 412 (e.g. a RRC Connection request) from the terminal 404, for example, by means of a receiver. The relay device 402 may read the information contained within the connection request 412. For example, the relay device 402 may read the identity of the cellular network (e.g. MCC/MNC/LAC) included in the connection request 412. Accordingly, the relay device 402 may forward (e.g by transmitting) the connection request 412 to the base station 406 of the cellular network identified in the connection request 412 as a forwarded request 414, for example, by means of a transmitter. The forwarded request 414 may include an identity (e.g. C-RNTI) of the relay device 402.

The relay device 402 may be connected to the cellular network identified in the connection request 412 via a cellular network connection (e.g. LTE network connection). Accordingly, the forwarded request 414 (e.g. a forwarded RRC Connection request) may be transmitted by the relay device 402 to the base station 406 of the cellular network via the cellular network connection (e.g. LTE network connection) established between the relay device 402 and the base station 406.

Alternatively, the relay device 402 may be a device that may have a high priority of access with respect to the base station 406. For example, the relay device 402 may easily establish a cellular network connection with at least one cellular network using the base station 406, for example, the relay device 402 may easily switch from a RRC_IDLE mode to a RRC_CONNECTED mode in a LTE communications system. Accordingly, the forwarded request 414 (e.g. a forwarded RRC Connection request) may be transmitted by the relay device 402 to the base station 406 after the relay device 402 has established a cellular network connection between itself and the base station 406 of the cellular network identified in the request 412.

As described above, the base station 406 may be shared among a plurality of PLMNs. Accordingly, the relay device 402 may transmit the forwarded request 414 to multiple PLMNs using the same base station 406 (e.g. the same eNB). Thereafter, the base station 406 may send the forwarded request 414 to the cellular network (or networks) identified in the connection request 412 and the forwarded request 414.

The base station 406 may allocate radio network resources to the terminal 404 based on the forwarded request 414. In other words, the base station 406 may select radio network resources for the terminal 404. For example, the base station 406 may allocate a time slot (e.g. a timing alignment value and/or a timing advance value) and/or a frequency sub-band and/or an access code (e.g RACH preamble) to the terminal 404. The base station 406 may provide information about the allocated radio network resources by transmitting a response 416 (e.g. a RRC Connection Setup message) to the relay device 402 using the cellular network connection (e.g. LTE network connection) established between the relay device 402 and the base station 406. Accordingly, the relay device 402 may receive the response 416, for example, by means of a receiver. The response 416 may include a tag, such as, for example, a forwarding flag configured to indicate to the relay device 402 that the response 416 is to be forwarded to the terminal 404. Accordingly, the response 416 may include the identity (e.g. C-RNTI) of the terminal 404. The response 416 may be a DL transmission from the base station 406 to the relay device 402. The signal power of the DL transmission to the relay device 402 may be adjusted by the base station 406 based on the measured signal power of the broadcast message 408 included in the connection request 412 and the forwarded request 414.

The relay device 402 may forward (e.g. by transmitting) the response 416 (e.g. RRC Connection Setup message) (e.g. by means of a transmitter), as a forwarded response 418, to the terminal 404 using the non-cellular radio connection 410 (e.g. Wi-Fi and/or Bluetooth) established between the relay device 402 and the terminal 404. Accordingly, the terminal 404 may be configured to receive (e.g. by means of a receiver) the forwarded response 418 from the relay device 402. The forwarded response 418 may include a timing advance value used by the relay device 402 in the cellular network connection established between the relay device 402 and the base station 406. For example, the timing advance value may be used by the relay device 402 to synchronize UL transmissions from the relay device 402 to the base station 406. In like manner, the terminal 404 may use the timing advance value included in the forwarded response 418 to synchronize an UL transmission from itself to the base station 406 of the cellular network. The timing advance value included in the forwarded response 418 may be provided by either the base station 406 or the relay device 402, or both. The timing advance value used by the relay device 402 may be suitable for synchronizing the UL transmission between the terminal 404 and the base station 406 since the relay device 402 and the terminal 404 may be in close proximity, e.g. since terminal 404 and relay device 402 may be connected to each other by a short-range communications technology, e.g. Wi-Fi and/or Bluetooth.

The terminal 404 may read the information included in the forwarded response 418, and may use this information to establish a cellular network connection (e.g. a LTE network connection) with the base station 406. For example, the terminal 404 may read the information about the radio network resources assigned to it by the cellular network, and may use the assigned radio network resources to establish the cellular network connection 420 with the base station 406 of the cellular network. By way of another example, the terminal 404 may use the timing advance value provided to it in the forwarded response 418 to adjust the timing of the UL transmission from the terminal 404 to the base station 406. By way of yet another example, the terminal 404 may adjust the signal power of the UL transmission based on the measured signal power of the broadcast message 408. The aforementioned examples are not mutually exclusive and may be carried out in combination with each other.

Therefore, the terminal 404 may establish a cellular network connection 420 (e.g. a LTE network connection) with the base station 406 without having to perform a random access procedure. A subsequent adjustment of the timing advance value may be possible after the cellular network connection 420 has been established between the terminal 404 and the base station 406.

In summary, the following may be observed in message flow 400:

1) The terminal 404 may detect potential relaying devices and select an appropriate one as the relay device 402.

2) The terminal 404 may use the relay device 402 to request for radio network resources from a cellular network.

3) The relay device 402 may forward a request for radio network resources between the terminal 404 and the base station 406 of the cellular network from which the radio network resources are requested.

4) The base station 406 may receive a connection request 412 from the terminal 404 within a message (e.g. a forwarded request 414) received from the relay device 402.

5) The base station 406 may send a response (e.g. a Connection Setup message) to the terminal 404 within messages sent to the relay device 402.

6) The terminal 404 may receive information about radio network resources allocated to it via the relay device 402.

7) The relay device 402 may supply its currently used timing advance value to the terminal 404.

8) The terminal 404 may use a timing advance value received from the relay device 402 to initially synchronise a UL transmission to a cellular network.

An effect of the message flow 400 of FIG. 4 may be at least one of the following:

1) Random access may be avoided for establishing a cellular network connection 420 between the terminal 404 and the cellular network (e.g. the base station 406 of the cellular network).

2) Calculation of a timing advance value may not be required since the timing advance value used by the relay device 402 may be forwarded to the terminal 404 in the response 416 and/or the forwarded response 418. Use of the timing advance value used by the relay device 402 may be effective when a distance between the terminal 404 and the relay device 402 is small, for example less than or equal to about 100 m, for example less than or equal to about 80 m, for example less than or equal to about 50 m, for example less than or equal to about 30 m, for example less than or equal to about 15 m, for example less than or equal to about 10 m, for example less than or equal to about 5 m, for example less than or equal to about 1 m, for example less than or equal to about 80 cm, for example less than or equal to about 50 cm, for example less than or equal to about 20 cm, although other distances may be possible as well.

Figure 5:
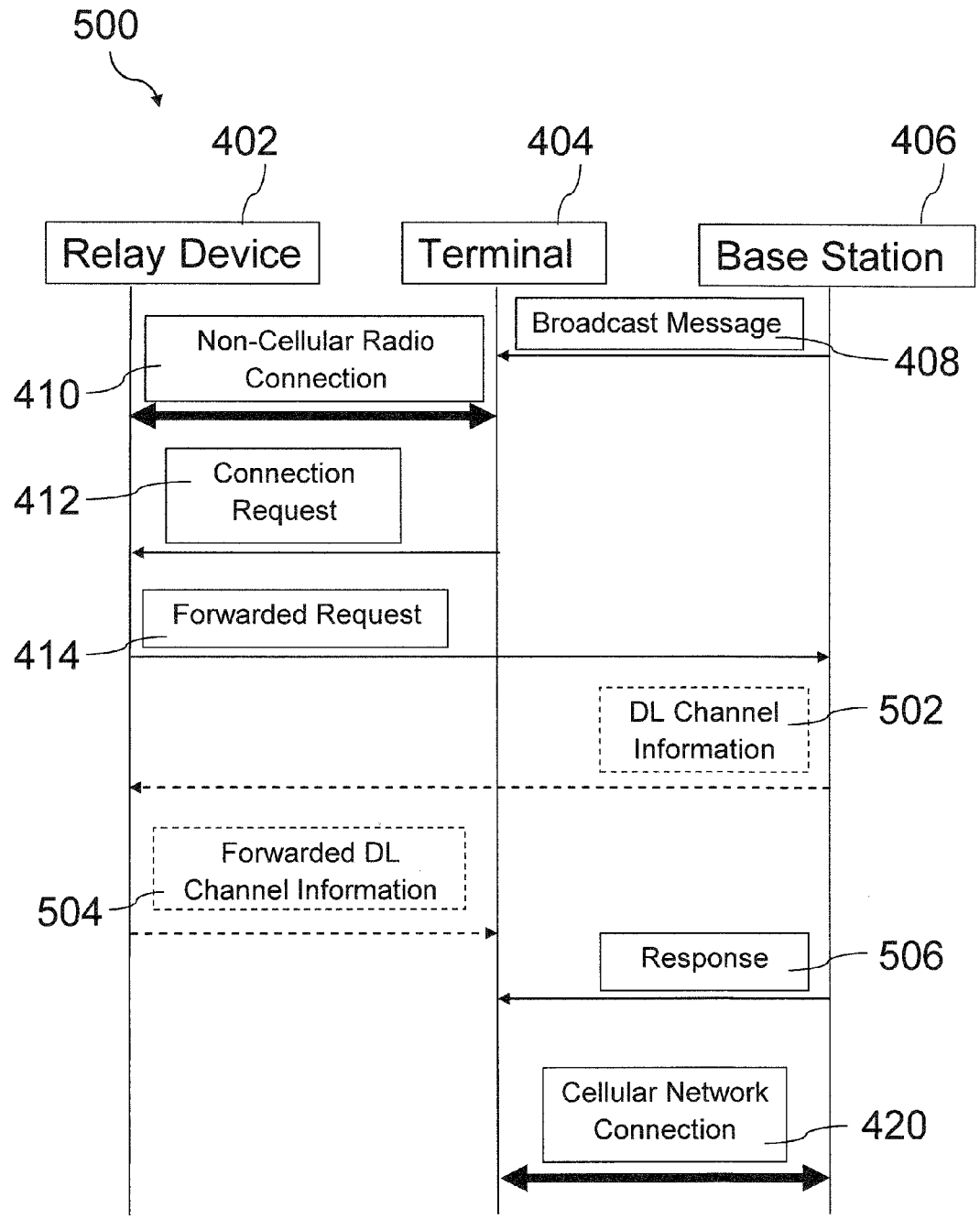
FIG. 5 shows a message flow among a relay device, a terminal, and a base station including a response sent from the base station directly to the terminal.

FIG. 5 shows a message flow 500 among a relay device 402, a terminal 404, and a base station 406 including a response 416 sent from the base station 406 directly to the terminal 404.

Reference signs in FIG. 5 that are the same as in FIG. 4 denote the same or similar elements as in FIG. 4. Thus, those elements will not be described in detail again here; reference is made to the description above. Differences between FIG. 5 and FIG. 4 are described below.

As described above, the relay device 402 may forward the connection request 412 to the base station 406 of the cellular network identified in the connection request 412 as the forwarded request 414.

The base station 406 may select and/or allocate radio network resources to the terminal 404 based on the forwarded request 414. For example, the base station 406 may allocate a time slot (e.g. a timing alignment value and/or a timing advance value) and/or a frequency sub-band and/or an access code (e.g RACH preamble) to the terminal 404. The allocation of radio network resources to the terminal 404 by the base station 406 may be performed by means of an allocation circuit.

The base station 406 may provide information about the allocated radio network resources by transmitting a response 506 (e.g. a RRC Connection Setup message) to the terminal 404, without using the relay device 402 as an intermediary device to forward the response 506. For example, the response 506 may be sent to the terminal 404 as a downlink (DL) transmission to the terminal 404. For example, the DL transmission may be sent on a PDSCH (Physical Downlink Shared Channel). Alternatively, the DL transmission may be sent on another DL resource, which may be indicated to the terminal 404 (see description below). Accordingly, the terminal 404 may be configured to receive (e.g. by means of a receiver) the response 506 from the base station 406.

The signal power of the response 506 (e.g. DL transmission) to the terminal 404 may be adjusted by the base station 406 based on the measured signal power of the broadcast message 408 included in the request 412 and the forwarded request 414. The response 506 may include an identity (e.g. C-RNTI) of the terminal 404, which may indicate to the devices within the cell served by the base station 406 that the response 506 may be intended for the terminal 404.

The response 506 may include a timing advance value used by the relay device 402 in the cellular network connection established between the relay device 402 and the base station 406. As described above in relation to the response 416 and forwarded response 418, the terminal 404 may use the timing advance value included in the response 506 to synchronize an UL transmission with the base station 406 of the cellular network.

As described above, the terminal 404 may read the information included in the response 506, and may use this information to establish the cellular network connection 420 (e.g. a LTE network connection) with the base station 406.

As described above, the response 506 may be sent to the terminal 404 as a DL transmission from the base station 406 to the terminal 404. The DL resources with which the response 506 is transmitted from the base station 406 to the terminal 404 may be indicated as DL channel information 502. The DL channel information 502 may be sent (e.g. transmitted) to the relay device 402 by a DL transmission from the base station 406 to the relay device 402. Therefore, the relay device 402 may receive the DL channel information 502 from the base station 406, for example, by means of a receiver. The channel information 502 may be sent to the relay device 402 before the response 506 is transmitted to the terminal 404. As described above, the DL channel information 502 may include information about the DL resources (e.g. DL channel (e.g. frequency sub-band), DL access code, DL time-slot, etc.) which may carry the response 506. The DL channel information 502 may include a forwarding flag configured to indicate to the relay device 402 that the DL channel information 502 is to be forwarded to the terminal 404. The DL channel information 502 may include an identity (e.g. C-RNTI) of the terminal 404. The relay device 402 may forward (e.g. by transmitting) the DL channel information 502 to the terminal 404 (e.g. by means of a transmitter) as forwarded DL channel information 504. The terminal 404 may read the information contained in the forwarded DL channel information 504, and may await transmission of the response 506 on the DL resource indicated in the forwarded DL channel information 504.

Effects and observations related to the message flow 400 may be equally applicable to the message flow 500 of FIG. 5. In addition, the following may be observed from the message flow 500:

1) The base station 406 may send DL resource information to the terminal 404 via the relay device 402. These DL resources may then be used by the base station 406 to send resource assignments directly to the terminal 404.

2) The terminal 404 may be able to receive information about DL resources on which it may receive resources from the network directly.

Figure 6:
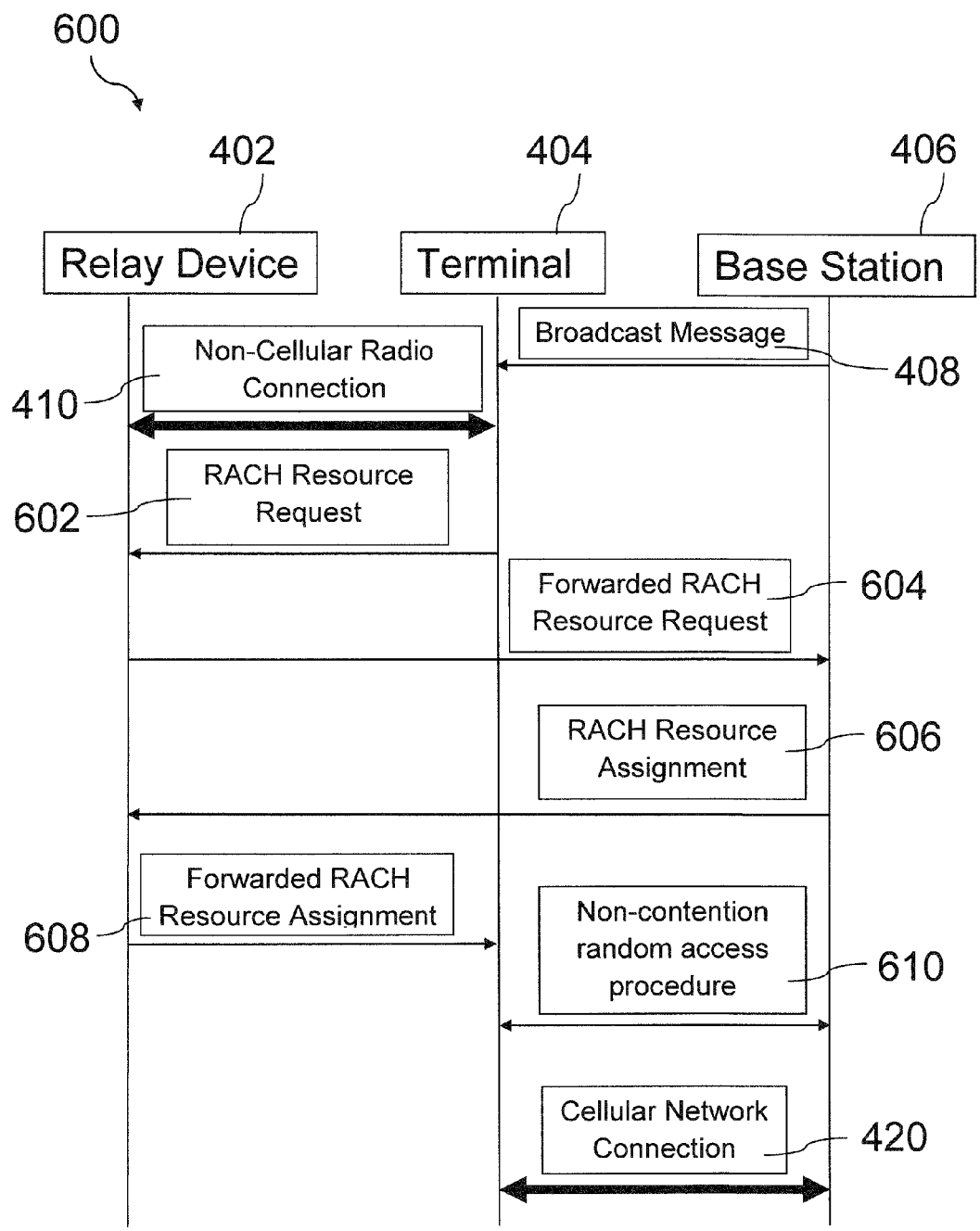
FIG. 6 shows a message flow among a relay device, a terminal, and a base station, including a non-contention random access preamble obtained by the terminal through the relay device.

FIG. 6 shows a message flow 600 among a relay device 402, a terminal 404, and a base station 406, wherein a non-contention random access preamble may be obtained by the terminal 404 through the relay device 402.

Reference signs in FIG. 6 that are the same as in FIG. 4 denote the same or similar elements as in FIG. 4. Thus, those elements will not be described in detail again here; reference is made to the description above. Differences between FIG. 6 and FIG. 4 are described below.

As shown in FIG. 6, the message flow 600 may include the broadcast message 408 transmitted by the base station 406 to the terminal 404.

Certain events (e.g. initial access to a cellular network, connection re-establishment, handover, etc.) may require a dedicated random access preamble in order for a cellular network connection to be established between the terminal 404 and the base station 406. For example, as described above, handover to another base station, downlink (DL) data synchronization, and positioning may require a dedicated random access preamble. Accordingly, the broadcast message 408 may include, among other things described above, an instruction to the terminal 404 to request for a random access preamble when connection to the base station is desired for such events (e.g. handover, positioning).

The message flow 600 may be used when a random access preamble is required for the terminal 404 to establish a cellular connection with the base station 406 (e.g. in events such as handover, DL data synchronization, positioning, etc.).

As shown in FIG. 6, the terminal 404 may establish the non-cellular radio connection 410 (e.g. a Wi-Fi connection) with the relay device 402 using information contained in the broadcast message 408.

The message flow 600 may include a request for RACH resources from a cellular network (hereinafter referred to as RACH resource request 602). For example, the RACH resource request 602 may be a request for a dedicated random access preamble from the cellular network. As described above, the terminal 404 may measure the signal power of the broadcast message 408. The RACH resource request 602 may include the measured signal power of the broadcast message 408.

The terminal 404 may transmit the RACH resource request 602 (e.g. request for dedicated random access preamble) to the relay device 402 via the non-cellular radio connection 410 (e.g. Wi-Fi connection) established between the relay device 402 and the terminal 404. The RACH resource request 602 transmitted from the terminal 404 to the relay device 402 may be encrypted using credentials (e.g. at least one secret key) stored on the SIM of at least one of the relay device 402 and the terminal 404.

The RACH resource request 602 (e.g. dedicated preamble request) may include an identity (e.g. C-RNTI) of the terminal 404, and an identity (e.g. MCC and/or MNC and/or LAC) of the cellular network from which radio network resources are requested. The RACH resource request 602 may include a forwarding flag. The forwarding flag of the RACH resource request 602 may be configured to indicate to the relay device 402 that the RACH resource request 602 is to be forwarded to the cellular network indicated in the RACH resource request 602 (e.g. the cellular network may be indicated by its MCC/MNC/LAC).

The relay device 402 may receive the RACH resource request 602 from the terminal 404 (e.g. by means of a receiver). The relay device 402 may read the information contained within the RACH resource request 602. Accordingly, the relay device 402 may forward (e.g. by transmitting by means of a transmitter) the RACH resource request 602 to the base station 406 of the cellular network identified in the RACH resource request 602 (also referred to as the cellular network) as a forwarded RACH resource request 604 (hereinafter forwarded request 604). The forwarded request 604 may include an identity (e.g. C-RNTI) of the relay device 402.

As described above, the relay device 402 may be connected to the cellular network identified in the RACH resource request 602 via a cellular network connection (e.g. LTE network connection). Alternatively, as described above, the relay device 402 may be a device that may have a high priority of access with respect to the base station 406.

The base station 406 may select and/or allocate a random access preamble to the terminal 404 based on the forwarded request 604. The base station 406 may provide the allocated random access preamble to the terminal 404 by transmitting a RACH resource assignment 606 to the relay device 402 using the cellular network connection (e.g. LTE network connection) established between the relay device 402 and the base station 406. The RACH resource assignment 606 may also include a frequency and a time slot (e.g. timing alignment value and/or timing advance value) for the terminal 404 to use the allocated random access preamble.

The base station 406 may start a timer upon transmission of the RACH resource assignment 606 to the relay device 402. The timer may, for example, count down from a pre-determined value (e.g. 10 seconds, although other values are possible). The base station 406 may expect reception of the allocated random access preamble from the terminal 404 before expiration of the timer. The base station 406 may release the allocated random access preamble if the terminal 404 fails to transmit the preamble within the time allocated, and/or at the time slot indicated in the RACH resource assignment 606. The pre-determined value of the timer may be included in the RACH resource assignment 606. The predetermined value of the timer may be known by the terminal 404 (e.g. since it may be included in the RACH resource assignment 606). Alternatively, the predetermined value of the timer may be a default value that may be pre-configured in the terminal 404.

The RACH resource assignment 606 may include a tag, such as, for example, a forwarding flag configured to indicate to the relay device 402 that the RACH resource assignment 606 is to be forwarded to the terminal 404. Accordingly, the RACH resource assignment 606 may include the identity (e.g. the C-RNTI) of the terminal 404. The RACH resource assignment 606 may be a DL transmission from the base station 406 to the relay device 402. The signal power of the DL transmission to the relay device 402 may be adjusted by the base station 406 based on the measured signal power of the broadcast message 408 included in the RACH resource request 602 and the forwarded request 604.

The relay device 402 may forward the RACH resource assignment 606, as a forwarded RACH resource assignment 608, to the terminal 404 using the non-cellular radio connection 410 (e.g. Wi-Fi and/or Bluetooth) established between the relay device 402 and the terminal 404. Accordingly, the terminal 404 may be configured to receive (e.g. by means of a receiver) the forwarded RACH resource assignment 608 from the relay device 402.

The terminal 404 may read the information included in the forwarded RACH resource assignment 608, and may use this information to start a non-contention random access procedure 610 to the base station 406 (see, for example, FIG. 2). Since the terminal 404 has received a dedicated random access preamble (included in forwarded RACH resource assignment 608), request for such a preamble from the base station 406 may not be necessary. The non-contention random access procedure 610 may include transmission of the random access preamble by the terminal 404 to the base station 406 (e.g. corresponding to random access preamble 208 in FIG. 2), and a random access response message transmitted by the base station 406 to the terminal 404 (e.g. corresponding to Random Access Response 210 in FIG. 2). The random access response may include a resource assignment (e.g. time-slot and/or frequency sub-band and/or access code) for a subsequent UL transmission from the terminal 404 to the base station 406.

The terminal 404 may establish a cellular network connection 420 with the base station 406 using information contained in the random access response included in the non-contention random access procedure 610. For example, the terminal 404 may use the assigned time-slot (e.g. timing alignment value and/or timing advance value) and/or frequency sub-band and/or access code to transmit a "Connection Request" message to the base station 406. The base station 406 may reply with a resource assignment for a UL-shared channel and/or DL-shared channel based on terminal's request, and a cellular network connection 420 may be established between the terminal 404 and the base station 406.

Similar to the message flow in FIG. 5, the RACH resource assignment 606 may be provided directly to the terminal 404 by the base station 406. Accordingly, DL resources with which the RACH resource assignment 606 is transmitted from the base station 406 directly to the terminal 404 may be indicated as DL channel information (e.g. as in DL channel information 502 in FIG. 5). The DL channel information may be sent to the relay device 402 and forwarded by the relay device 402 to the terminal 404, before the RACH resource assignment 606 is transmitted from the base station 406 directly to the terminal 404.

An effect of the message flow 600 may be at least one of the following:

1) Avoidance of contention-based random access for establishing a connection to a cellular network.

2) Accurate calculation of UL timing and/or UL transmit power required for establishing the cellular network connection 420.

3) More precise timing advance value, since this may be provided by the base station 406 to the terminal 404 in the RACH resource assignment 606.

Figure 7:
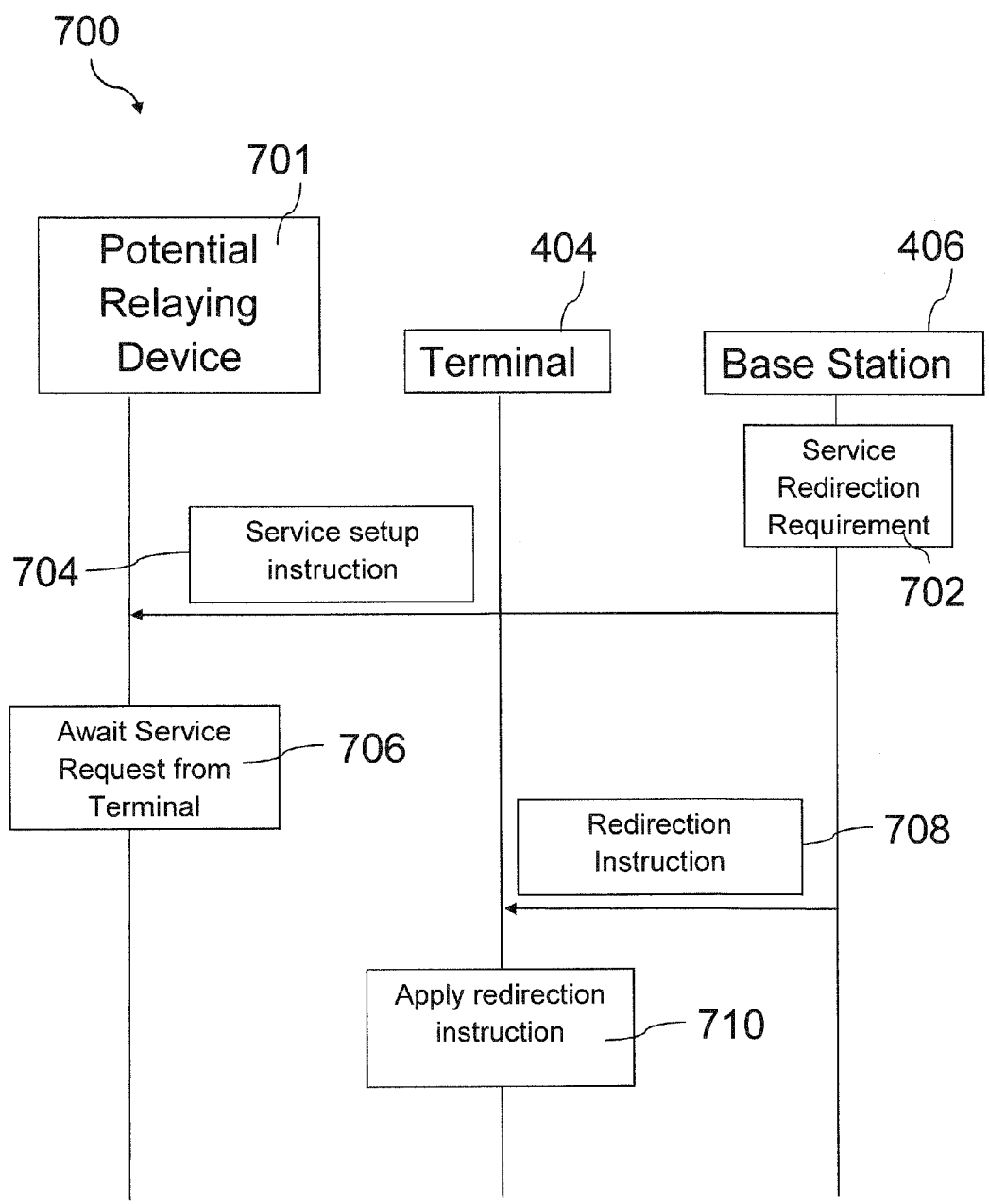
FIG. 7 shows a message flow among a potential relaying device, a terminal, and a base station, where the base station instructs the terminal to use the potential relaying device to establish a cellular network connection.

FIG. 7 shows a message flow 700 among a potential relaying device 701, a terminal 404, and a base station 406, wherein the base station 406 instructs the terminal 404 to use the potential relaying device 701 to establish a cellular network connection.

Only potential relaying device 701 is shown as an example, however the number of potential relaying devices may be greater than one, and may, for example, be two, three, four, five, six, seven, eight, nine, or on the order of tens, hundreds of, or even more potential relaying devices.

Reference signs in FIG. 7 that are the same as in FIG. 4 denote the same or similar elements as in FIG. 4. Thus, those elements will not be described in detail again here; reference is made to the description above. Differences between FIG. 7 and FIG. 4 are described below.

The base station 406 may detect the need to reduce the usage of contention based random access. For example, the base station 406 may expect a RACH overload (e.g. the base station 406 may detect that there may be more terminals than the number of available RACH preambles). By way of another example, the base station 406 may plan to reduce the RACH resources (e.g. reduce the available time slots and/or frequency bands and/or access codes for RACH access) in order to use them for at least one UL shared channel.

Alternatively, or in addition to the above, the base station 406 may detect the opportunity to use a potential relaying device 701 (e.g. by means of a detection circuit). For example, at least one potential relaying device 701 may be detected in the cell served by the base station 406 and/or the at least one potential relaying device 701 may offer to act as an intermediary device (e.g. a beacon) to relay messages to the base station 406 (see description below in relation to FIG. 8).

Detecting the need to reduce the usage of contention based random access and/or detecting the opportunity to use a relay device (e.g. by means of a detection circuit) may trigger a service redirection requirement 702 in the base station 406. A service may refer to either one of a connection request (e.g. in respect of FIG. 4 and FIG. 5) or a request for a RACH preamble (e.g. in respect of FIG. 6). In other words, the base station 406 may detect the need to redirect a connection request and/or request for a RACH preamble in order to avoid contention, collision and/or RACH overload. The base station 406 may select which service to redirect. For example, the base station 406 may determine that connection requests may need to be requested through a potential relaying device 701 in order to avoid contention, collision and/or RACH overload. Alternatively, or in addition to the above, the base station 406 may determine that RACH preamble requests may need to be requested through a potential relaying device 701 in order to avoid contention, collision and/or RACH overload.

The base station 406 may assign at least one service to each potential relaying device. The assignment of a service to a potential relaying device may depend on signal quality of a cellular connection between the base station 406 and the potential relaying device, remaining battery capacity of the potential relaying device, etc.

The assignment of the at least one service to each potential relaying device 701 may be included in a service setup instruction 704. The service setup instruction 704 may be generated by the base station 406 (e.g by means of a generator, which may be implemented as a circuit). The service setup instruction 704 may be transmitted by the base station 406 (e.g. by means of a transmitter) to the potential relaying device 701. Accordingly, the potential relaying device 701 may receive the service setup instruction 704 from the base station 406, e.g. by means of a receiver. The service setup instruction 704 may be used by the potential relaying device 701 to configuring its forwarding capability. For example, the service setup instruction 704 may include the type of service to be setup (e.g. connection request and/or random access preamble request). The service setup instruction 704 may include policies that may restrict the usage of each service type to certain events. In other words, the service setup instruction 704 may indicate which events may use a particular service. For example, random access preamble request may be used for only position, whilst connection request may be used for initial access to a cellular network, e.g. initial access from RRC_IDLE state.

The service setup instruction 704 may include information about the connection between the potential relaying device 701 and the base station 406. For example, this may include routing instructions for messages exchanged between the terminal 404 and the base station 406, through the potential relaying device 701.

The potential relaying device 701 may apply the service setup instruction 704, and may await a service request from the terminal 404 (indicated as 706 in FIG. 7).

The base station 406 may broadcast system information to the terminal 404 that may include a redirection instruction 708. Accordingly, the redirection instruction 708 may correspond to the broadcast message 408 in FIG. 4 to FIG. 6. Accordingly, the terminal 404 may be configured to receive (e.g. by means of a receiver) the redirection instruction 708 from the base station 406.

The redirection instruction 708 may include an instruction to the terminal 404 to use the potential relaying device 701 as an intermediary device for a connection request and/or random access preamble request. The redirection instruction 708 may include information which services (e.g. a connection request and/or random access preamble request) may be used for the potential relaying device 701.

The redirection instruction 708 may include an indication that the potential relaying device 701 may be present in the cell served by the base station 406 (or in a neighboring cell of the base station 406). The redirection instruction 708 may include an identity (e.g. C-RNTI) of the potential relaying device 701. The redirection instruction 708 may include information about a position of the potential relaying device 701. The redirection instruction 708 may include information (e.g. network configuration and/or identity, for example MCC/MNC/LAC) about at least one cellular network that may be registered with the potential relaying device 701. The redirection instruction 708 may also include information (e.g. configuration and/or identity, for example SSID) about the at least one non-cellular radio technology supported by the potential relaying device 701.

The terminal 404 may apply the received redirection instruction 708 (indicated as 710 in FIG. 7). For example, the terminal 404 may need to perform positioning, and may select a potential relaying device 701 which may support positioning as the relay device 402 shown in FIG. 4 to FIG. 6. Thereafter, the message flow 700 may proceed in the manner of either one of FIG. 4, FIG. 5, or FIG. 6.

In summary, the following may be observed from the message flow 700 of FIG. 7:

1) The base station 406 of the cellular network may detect the need and/or the opportunity to redirect at least one service.

2) The base station 406 may instruct the potential relaying device 701 to offer a redirection service and may supply configuration parameters to the potential relaying device 701.

3) The base station 406 may instruct the terminal 404 to use a redirection service.

4) The terminal 404 may be given information (e.g. configuration parameters) by the base station 406 that may be used to select a relay device 402 from the at least one potential relaying devices 701.

An effect of the message flow 700 of FIG. 7 may be at least one of the following:

1) Reduced usage of RACH resources.

2) The base station 406 may have control of over the setup of the potential relaying device 701.

3) The base station 406 may instruct the terminal 404 to use a service via the potential relaying device 701.

4) A user may experience a low delay during connection setup due to a lower number of rejected connection requests since RACH overload may be avoided.

Figure 8:
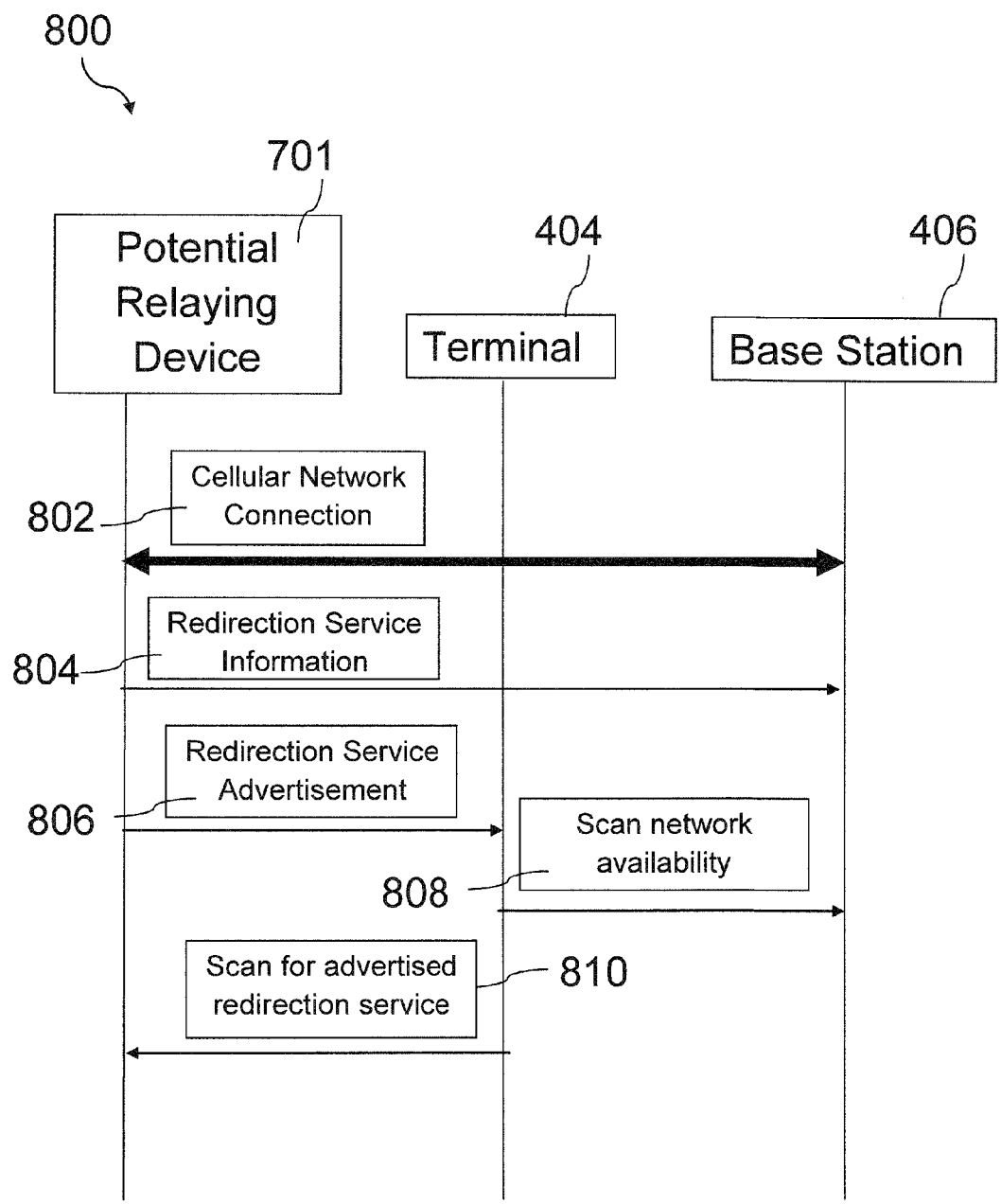
FIG. 8 shows a message flow among a potential relaying device, a terminal, and a base station, where the potential relaying device advertises its services to the terminal and the base station.

FIG. 8 shows a message flow 800 among a potential relaying device 701, a terminal 404, and a base station 406, wherein the potential relaying device 701 advertises its services to the terminal 404 and the base station 406.

Reference signs in FIG. 8 that are the same as in FIG. 4 and FIG. 7 denote the same or similar elements as in FIG. 4 and FIG. 7. Thus, those elements will not be described in detail again here; reference is made to the description above. Differences between FIG. 8 and FIGS. 4 and 7 are described below.

The message flow 800 may be used in cases where a RACH overload may be foreseen by the terminal 404 and the detection by the base station 406 may be too late or inexact.

The potential relaying device 701 may establish a cellular network connection 802 (e.g. LTE network connection) with the base station 406.

The potential relaying device 701 may choose to act as an intermediary device for messages between the terminal 404 and the base station 406. Accordingly, the potential relaying device 701 may send this information to the base station 406 as a redirection service information 804. The redirection service information 804 may include information about the availability (i.e. willingness and/or capability) of the potential relaying device 701 as an intermediary device for terminals within the cell served by the base station 406. Stated differently, the redirection service information 804 may be a message that may include information indicating the availability (i.e. willingness and/or capability) of the potential relaying device 701 to forward (e.g by transmitting by means of a transmitter) a request for radio network resources from the terminal 404 to the base station 406 of a cellular network. The potential relaying device 701 may receive a control message (not shown in FIG. 8) from the base station 406. The control message may include configuration parameters. For example, the potential relaying device 701 may use the control message to set up the redirection service for the terminal 404.

The potential relaying device 701 may thereafter be ready for the redirection service and may await for requests (e.g. connection requests and/or random access preamble requests) from the terminal 404.

The potential relaying device 701 may transmit, periodically, a redirection service advertisement 806. The redirection service advertisement 806 may indicate to a terminal 404 the availability (i.e. willingness and/or capability) of the potential relaying device 701 to forward (e.g by transmitting by means of a transmitter) a request for radio network resources from the terminal 404 (e.g. a UE) to the base station 406 of a cellular network. The potential relaying device 701 may broadcast this redirection service advertisement 806 via a short-range communications technology (e.g. Wi-Fi connection). The redirection service advertisement 806 may be transmitted on the short-range communications technology as a broadcast message (e.g. a beacon message), or as a dedicated message to the terminal 404. Accordingly, the terminal 404 may be configured to receive (e.g. by means of a receiver) the redirection service advertisement 806 from the potential relaying device 701.

The redirection service advertisement 806 may include an identity of the connected cellular network (e.g. the identity of the cellular network of the connection 802). For example, the identity of the connected cellular network may be a MCC/MNC/LAC of the cellular network using and/or sharing the base station 406. The redirection service advertisement 806 may also include information about the type of redirection services the potential relaying device 701 may be capable of. For example, the redirection service advertisement 806 may indicate that the potential relaying device 701 may be used for a connection request and/or a random access preamble request.

The terminal 404 may read the redirection service advertisement 806 and may want to connect to a cellular network. The terminal 404 may first scan for the availability of the network (indicated as 808 in FIG. 8). If the network is available, the terminal 404 may scan for the periodically advertised redirection service 810 on the short-range communications technology (e.g. Wi-Fi connection). The terminal 404 may decide to use the redirection service offered by the potential relaying device 701 instead of performing a contention based random access procedure with the cellular network. The terminal 404 may decide to use the redirection service based on a signal quality of the potential relaying device 701 and/or because the potential relaying device 701 may be preferred by the user and/or the cellular network operator to use this service. The terminal 404 may then select the potential relaying device 701 as the relay device 402 shown in FIG. 4 to FIG. 6. Thereafter, the message flow 800 may proceed in the manner of either one of FIG. 4, FIG. 5, or FIG. 6.

In summary, the following may be observed from the message flow 800:

1) The potential relaying device 701 may inform the base station of the cellular network that it may be capable of redirection, and may negotiate the usage and/or parameters with the base station 406.

2) The potential relaying device 701 may advertise its capability to provide at least one service (eg, connection requests and/or random access preamble requests) via its short-range communications technology (e.g. Wi-Fi) to the terminal 404.

An effect of the message flow 800 may be at least one of:

1) Enabling a redirection service even in the case when the cellular network has not detected the need or the opportunity to do so.

2) Faster decision about the need and/or the opportunity for using a redirection service.

Figure 9:
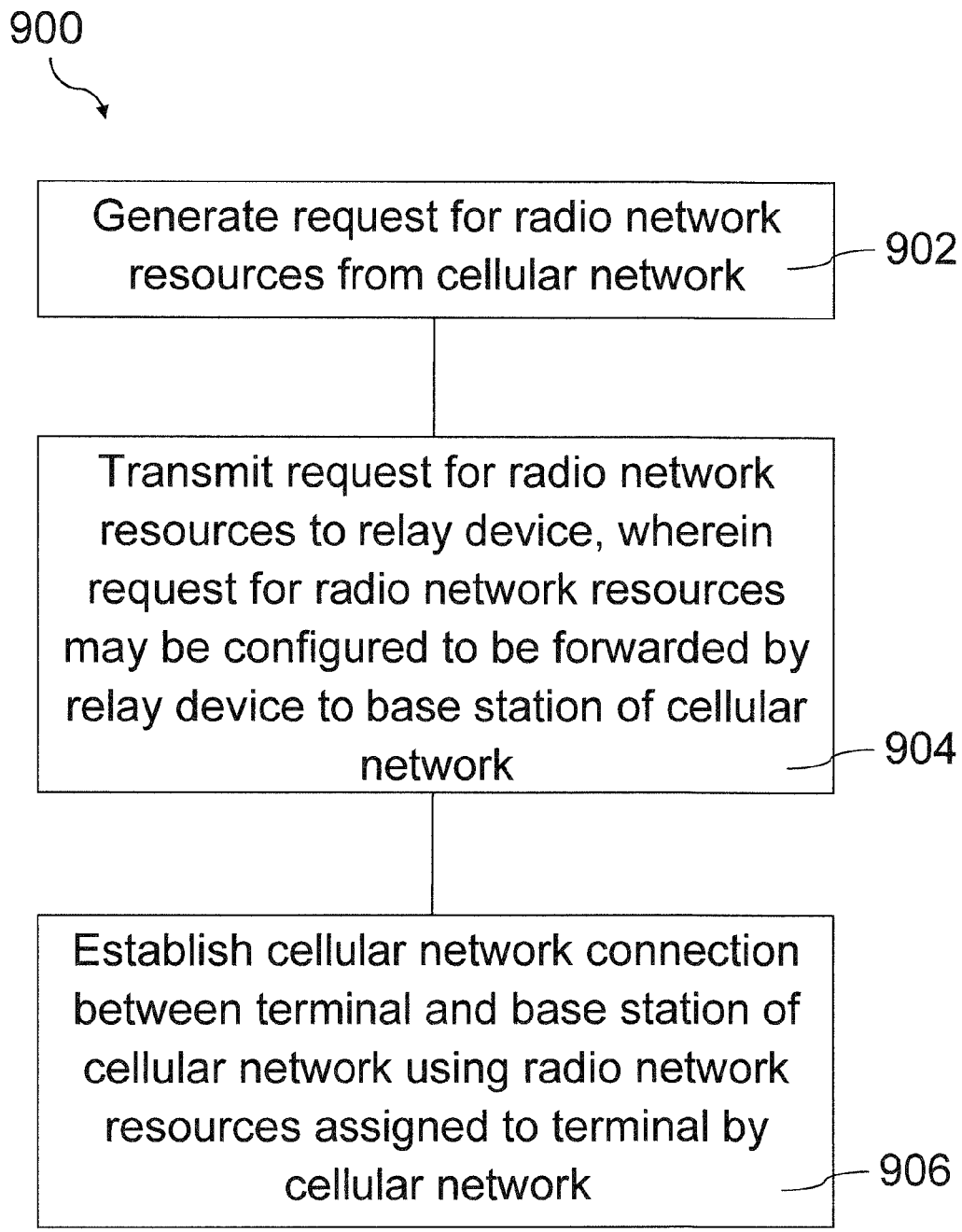
FIG. 9 shows a method for establishing a cellular network connection between a terminal and a base station.

FIG. 9 shows a method 900 for establishing a cellular network connection between a terminal and a base station.

The method 900 may include: generating a request for radio network resources from a cellular network (in 902); transmitting the request for radio network resources to a relay device, wherein the request for radio network resources may be configured to be forwarded by the relay device to the base station of the cellular network (in 904); and establishing a cellular network connection between the terminal and the base station of the cellular network using radio network resources assigned to the terminal by the cellular network (in 906).

The features of the message flows shown in FIG. 4 to FIG. 8 may be applicable to method 900 shown in FIG. 9.

According to various examples described herein, a terminal may be provided. The terminal may include a generator configured to generate a request for radio network resources from a cellular network; a transmitter configured to transmit the request for radio network resources to a relay device, wherein the request for radio network resources may be configured to be forwarded by the relay device to a base station of the cellular network; and a controller configured to establish a cellular network connection between the terminal and the base station of the cellular network using radio network resources assigned to the terminal by the cellular network.

The request for radio network resources may include a request for a time slot for a transmission from the terminal to the base station of the cellular network.

The request for radio network resources may include a request for a frequency sub-band for a transmission from the terminal to the base station of the cellular network.

The request for radio network resources may include a request for an access code for a channel between the terminal and the base station of the cellular network.

The request for radio network resources may include a request for a random access preamble from the cellular network.

The request for radio network resources may include an identity of the terminal; and an identity of the cellular network.

The request for radio network resources may include an identity of the relay device.

The request for radio network resources may include a forwarding flag for indicating to the relay device that the request for radio network resources may need to be forwarded to the base station of the cellular network.

The request for radio network resources may include a radio resource control (RRC) connection request.

The request for radio network resources may include: a request for a dedicated random access channel (RACH) preamble.

The transmitter may be configured to transmit the request for radio network resources to the relay device according to a short-range communications technology.

The short-range communications technology may include at least one of Wi-Fi, Bluetooth, Ultra-Wideband, and Zig-Bee.

The request for radio network resources may be configured to be forwarded by the relay device to the base station using a cellular radio communications technology.

The cellular radio communications technology may include at least one of LTE, UMTS, GSM, and CDMA2000.

The terminal may further include a receiver configured to receive a message from at least one of the base station and the relay device.

The message from the relay device may include information about radio network resources assigned to the terminal by the cellular network.

The message from the relay device may include a timing advance value for an uplink transmission from the terminal to the base station.

The message from the base station may include information about radio network resources assigned to the terminal by the cellular network.

The message from the base station may include an instruction to use at least one potential relaying device as the relay device.

The message from the base station may include information for selecting the relay device from at least one potential relaying device.

The information for selecting the relay device from the at least one potential relaying device may include a position of the at least one potential relaying device; and an identity of at least one radio access technology supported by the at least one potential relaying device.

The identity of at least one radio access technology may include a service set identifier (SSID) of at least one short-range communications technology supported by the at least one potential relaying device.

The identity of at least one radio access technology may include at least one of a Mobile Country Code (MCC), Mobile Network Code (MNC), and Location Area Code (LAC) of at least one cellular radio communications technology supported by the at least one potential relaying device.

The information for selecting the relay device from the at least one potential relaying device may include an indication of a redirection service offered by the at least one potential relaying device.

According to various examples described herein, a relay device may be provided. The relay device may include a transmitter configured to transmit a message indicating an availability of the relay device to forward a request for radio network resources from a cellular network by a terminal to a base station of the cellular network.

The transmitter may further be configured to forward the request for radio network resources from the cellular network by the terminal to the base station of the cellular network.

The relay device may further include a receiver configured to receive, from the terminal, the request for radio network resources from the cellular network.

The receiver may be further configured to receive a control message from the base station of the cellular network, wherein the control message may be used by the relay device to set up a redirection service.

According to various examples described herein, a base station may be provided. The base station may include a detection circuit configured to detect an opportunity to use a relay device to forward a request for radio network resources from a cellular network by a terminal to the base station; a generator configured to generate a service setup instruction for configuring the forwarding capability of the relay device; and a transmitter configured to transmit the service setup instruction to the relay device.

According to various examples described herein, a method for establishing a cellular network connection between a terminal and a base station may be provided. The method may include generating a request for radio network resources from a cellular network; transmitting the request for radio network resources to a relay device, wherein the request for radio network resources may be configured to be forwarded by the relay device to the base station of the cellular network; and establishing a cellular network connection between the terminal and the base station of the cellular network using radio network resources assigned to the terminal by the cellular network.

While various aspects have been particularly shown and described with reference to these aspects of this disclosure, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A terminal, comprising:
a generator to generate a request for radio network resources from a cellular network;
a transmitter to transmit the request for radio network resources to a relay device at a time in which both the terminal and the relay device are located within a cell served by a base station,
wherein the request for radio network resources includes a request for a dedicated random access channel (RACH) preamble and is to be forwarded by the relay device to the base station of the cellular network; and
a controller to:
receive a RACH assignment, which includes a dedicated RACH preamble, based on the request; and
perform a non-contention based random access procedure with the base station by sending the dedicated RACH preamble directly to the base station to establish a cellular network connection between the terminal and the base station of the cellular network using radio network resources assigned to the terminal by the cellular network.

2. The terminal of claim 1, wherein the request for radio network resources comprises:
an identity of the terminal; and
an identity of the cellular network.

3. The terminal of claim 1, wherein the request for radio network resources comprises:
an identity of the relay device.

4. The terminal of claim 1, wherein the request for radio network resources comprises:
a forwarding flag for indicating to the relay device that the request for radio network resources is to be forwarded to the base station of the cellular network.

5. The terminal of claim 1, wherein the transmitter is to transmit the request for radio network resources to the relay device according to a short-range communications technology.

6. The terminal of claim 5, wherein the short-range communications technology comprises Wi-Fi, Bluetooth, Ultra-Wideband, or ZigBee.

7. The terminal of claim 1, wherein the request for radio network resources is to be forwarded by the relay device to the base station using a cellular radio communications technology.

8. The terminal of claim 7, wherein the cellular radio communications technology comprises LTE, UMTS, GSM, or CDMA2000.

9. The terminal of claim 1, further comprising:
a receiver to receive a message from the base station or the relay device.

10. The terminal of claim 9, wherein the message from the relay device comprises: information about radio network resources assigned to the terminal by the cellular network.

11. The terminal of claim 9, wherein the message from the relay device comprises:
a timing advance value for an uplink transmission from the terminal to the base station.

12. The terminal of claim 9, wherein the message from the base station comprises:
information about radio network resources assigned to the terminal by the cellular network.

13. The terminal of claim 9, wherein the message from the base station comprises:
an instruction to use at least one potential relaying device as the relay device.

14. The terminal of claim 9, wherein the message from the base station comprises:
information for selecting the relay device from at least one potential relaying device.

15. The terminal of claim 14, wherein the information for selecting the relay device from the at least one potential relaying device comprises:
a position of the at least one potential relaying device; and
an identity of at least one radio access technology supported by the at least one potential relaying device.

16. The terminal of claim 15, wherein the identity of at least one radio access technology comprises:
a service set identifier (SSID) of at least one short-range communications technology supported by the at least one potential relaying device.

17. The terminal of claim 15, wherein the identity of at least one radio access technology comprises:
a Mobile Country Code (MCC), Mobile Network Code (MNC), or Location Area Code (LAC) of at least one cellular radio communications technology supported by the at least one potential relaying device.

18. The terminal of claim 14, wherein the information for selecting the relay device from the at least one potential relaying device comprises:
an indication of a redirection service offered by the at least one potential relaying device.

19. A base station, comprising:
a receiver to receive, from a relay device, a request by a terminal for radio network resources from a cellular network, wherein the request is a random access channel resource (RACH) request for a dedicated random access channel (RACH) preamble and is received at a time in which both the terminal and the relay device are located within a cell served by the base station;
an allocation circuit to perform a RACH assignment to the terminal based on the request for a dedicated RACH preamble, the RACH assignment to include a dedicated RACH preamble for the terminal; and
a transmitter to transmit information about the RACH assignment to the terminal or the relay device,
wherein the receiver is further to receive the dedicated RACH preamble directly from the terminal as part of a non-contention random access procedure.

20. The base station of claim 19, further comprising:
a detection circuit to detect an opportunity to use the relay device to forward the request by the terminal for radio network resources from the cellular network to the base station;
a generator to generate a service setup instruction for configuring the relay device to forward the request; and
a transmitter to transmit the service setup instruction to the relay device.

21. A method for establishing a cellular network connection between a terminal and a base station, comprising:
generating a request for radio network resources from a cellular network, the request being a random access channel (RACH) request for a dedicated RACH preamble;
transmitting the request for radio network resources to a relay device at a time in which both the terminal and the relay device are located in a cell served by the base station,
wherein the request for radio network resources is configured to be forwarded by the relay device to the base station of the cellular network;

receive a RACH assignment, which includes a dedicated RACH preamble, based on the request; and perform a non-contention random access procedure by sending the dedicated RACH preamble directly to the base station to establish a cellular network connection between the terminal and the base station of the cellular network using radio network resources assigned to the terminal by the cellular network.

\* \* \* \* \*